(12) United States Patent
Bradley et al.

(10) Patent No.: US 6,289,260 B1
(45) Date of Patent: Sep. 11, 2001

(54) AUTOMATED ORDER PICK PROCESS

(75) Inventors: Robert E. Bradley; Bruce Shingleton; Shankar Narayan, all of York, PA (US)

(73) Assignee: St. Onge Company, York, PA (US)

( * ) Notice: Subject to any disclaimer, the term of this patent is extended or adjusted under 35 U.S.C. 154(b) by 0 days.

(21) Appl. No.: 09/238,877

(22) Filed: Jan. 27, 1999

Related U.S. Application Data

(63) Continuation-in-part of application No. 09/019,274, filed on Feb. 5, 1998, now Pat. No. 6,061,607.

(51) Int. Cl.⁷ ........................................................ G06F 7/00
(52) U.S. Cl. ........................ 700/216; 414/273; 414/280
(58) Field of Search .................................. 700/214, 216, 700/219; 414/273, 280, 267, 626, 627

(56) References Cited

U.S. PATENT DOCUMENTS

| | | |
|---|---|---|
| 2,920,916 | 1/1960 | Pagdin . |
| 3,526,327 | 9/1970 | Atwater . |
| 3,661,280 | 5/1972 | Atwater . |
| 3,782,564 | 1/1974 | Burt . |
| 4,000,821 | 1/1977 | Naito et al. . |
| 4,176,995 | 12/1979 | Wise . |
| 4,516,762 | 5/1985 | Moltrasio et al. . |
| 4,542,808 | 9/1985 | Lloyd, Jr., et al. . |
| 4,678,390 | 7/1987 | Bonneton et al. . |
| 4,792,273 | 12/1988 | Specht . |
| 4,850,783 | 7/1989 | Maekawa . |
| 4,883,401 | 11/1989 | Kavieff . |
| 4,932,828 | 6/1990 | Katae et al. . |
| 4,974,166 | 11/1990 | Maney et al. . |
| 5,271,703 | 12/1993 | Lindqvist et al. . |
| 5,358,375 | 10/1994 | Kawada et al. . |
| 5,372,473 | 12/1994 | Moyden et al. . |
| 5,380,139 | 1/1995 | Pohjonen et al. . |
| 5,468,110 | 11/1995 | McDonald et al. . |
| 5,482,139 | 1/1996 | Rivalto . |
| 5,509,572 | 4/1996 | Curtis . |
| 5,564,879 | 10/1996 | Noguchi . |
| 6,061,607 | * 5/2000 | Bradley et al. ................. 700/216 X |
| 6,064,921 | * 5/2000 | Pippin et al. .................... 700/216 X |

FOREIGN PATENT DOCUMENTS

| | | |
|---|---|---|
| 0 611 707 | 8/1994 | (EP) . |
| 0 621 215 | 10/1994 | (EP) . |
| 2 593 481 | 7/1987 | (FR) . |
| 2 696 722 | 4/1994 | (FR) . |

OTHER PUBLICATIONS

Macron Dynamics, Inc., *High Speed Linear Actuators That Go The Distance*, one page, Jul. 17, 1996.

SI Handling Systems, Inc., *The Next Generation Order Selection Machine*, one page, Jul. 17, 1996.

Barry Wright Corporation, Sensoflex™ Vacuum Gripper System * Part No. VG101-1, one page, Jul. 17, 1996.

* cited by examiner

*Primary Examiner*—Christopher P. Ellis
*Assistant Examiner*—Gene O. Crawford
(74) *Attorney, Agent, or Firm*—Flynn, Thiel, Boutell & Tanis, P.C.

(57) ABSTRACT

A method for controlling order setup and operation of order fulfillment devices, which devices include dispensers that dispense low quantities of low-demand articles from an inventory containing a very large number of different low-demand articles. The method arranges the articles in totes so the dispensers have efficient access thereto, and efficiently refills the totes based upon past orders.

22 Claims, 29 Drawing Sheets

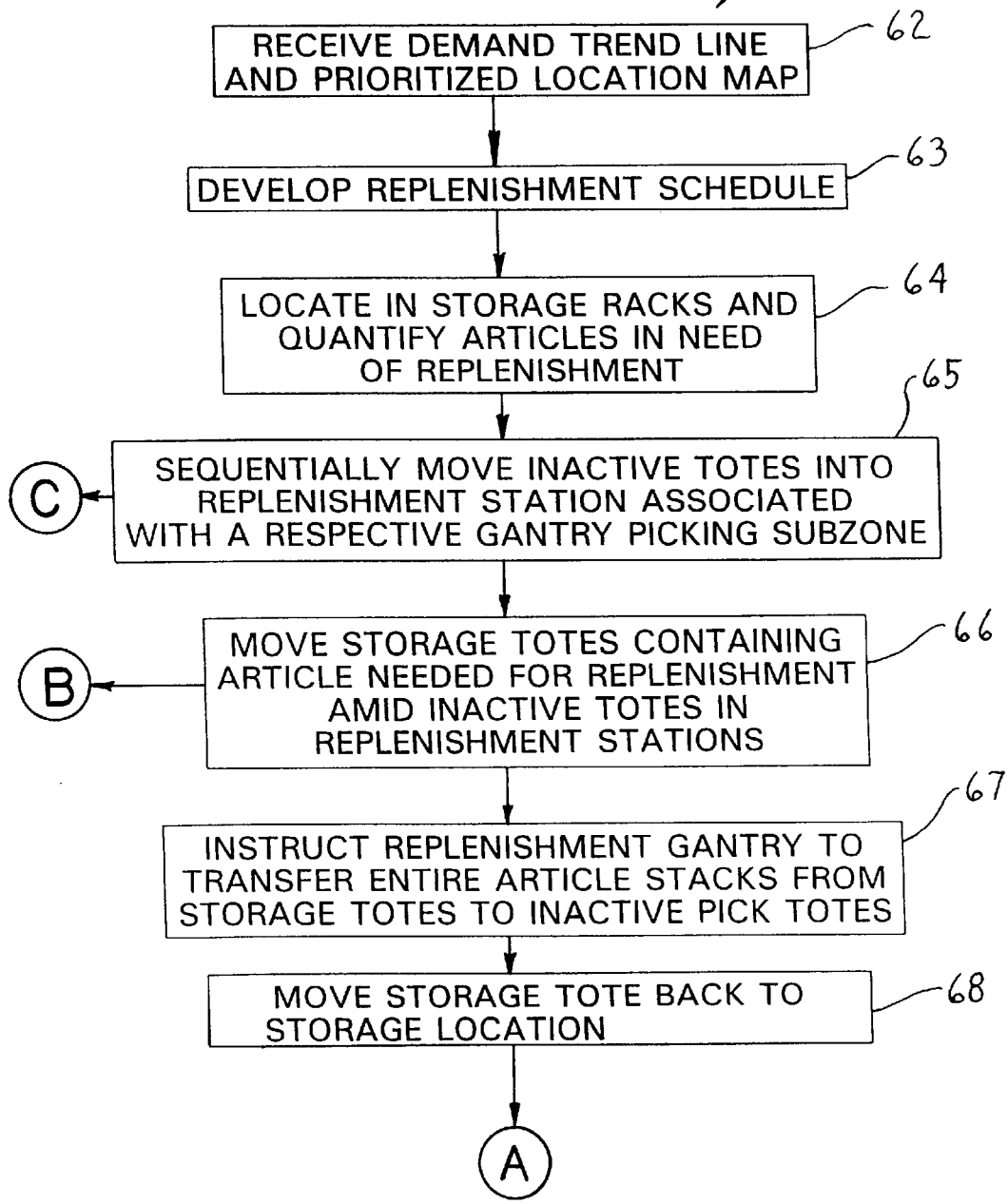

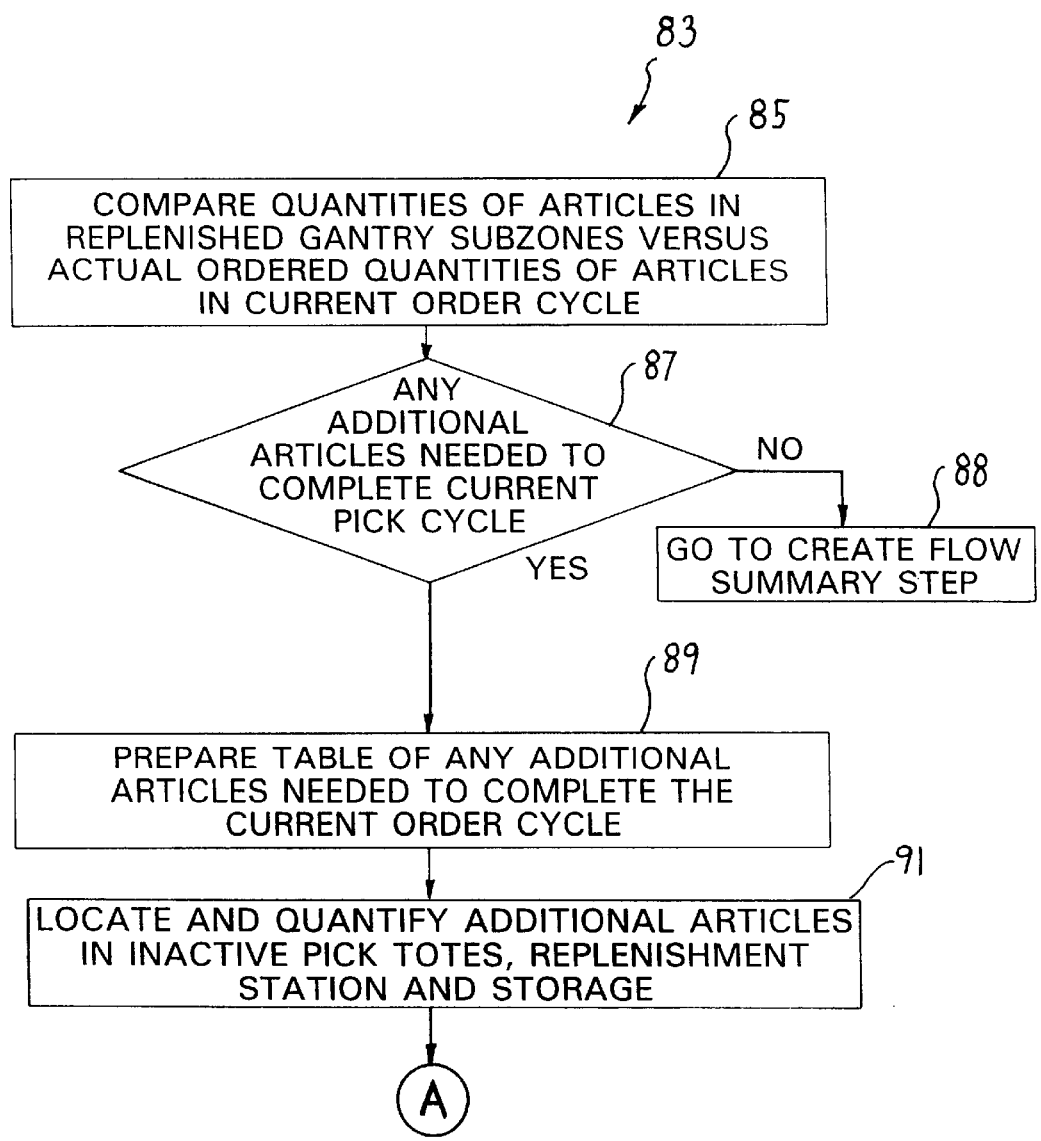

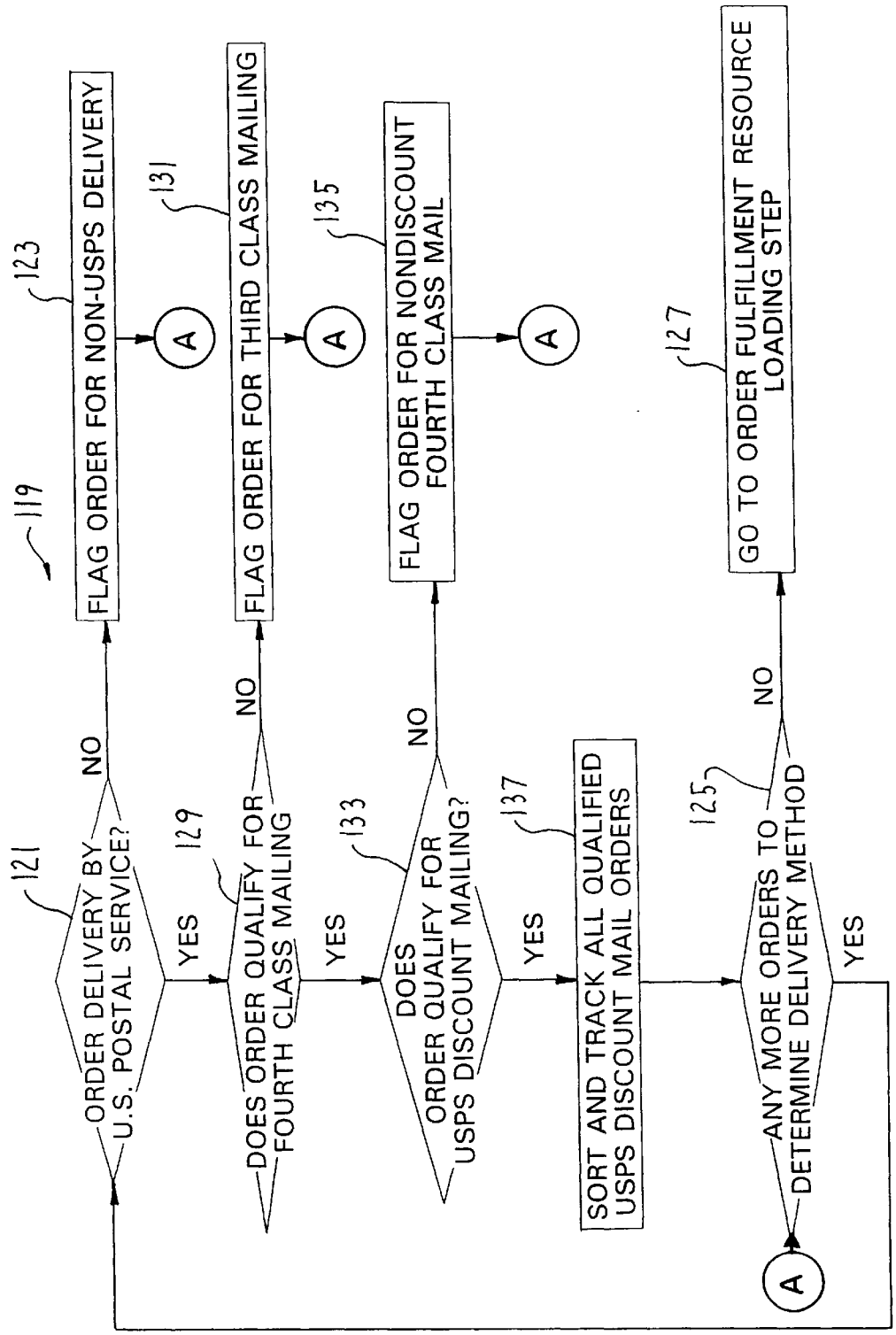

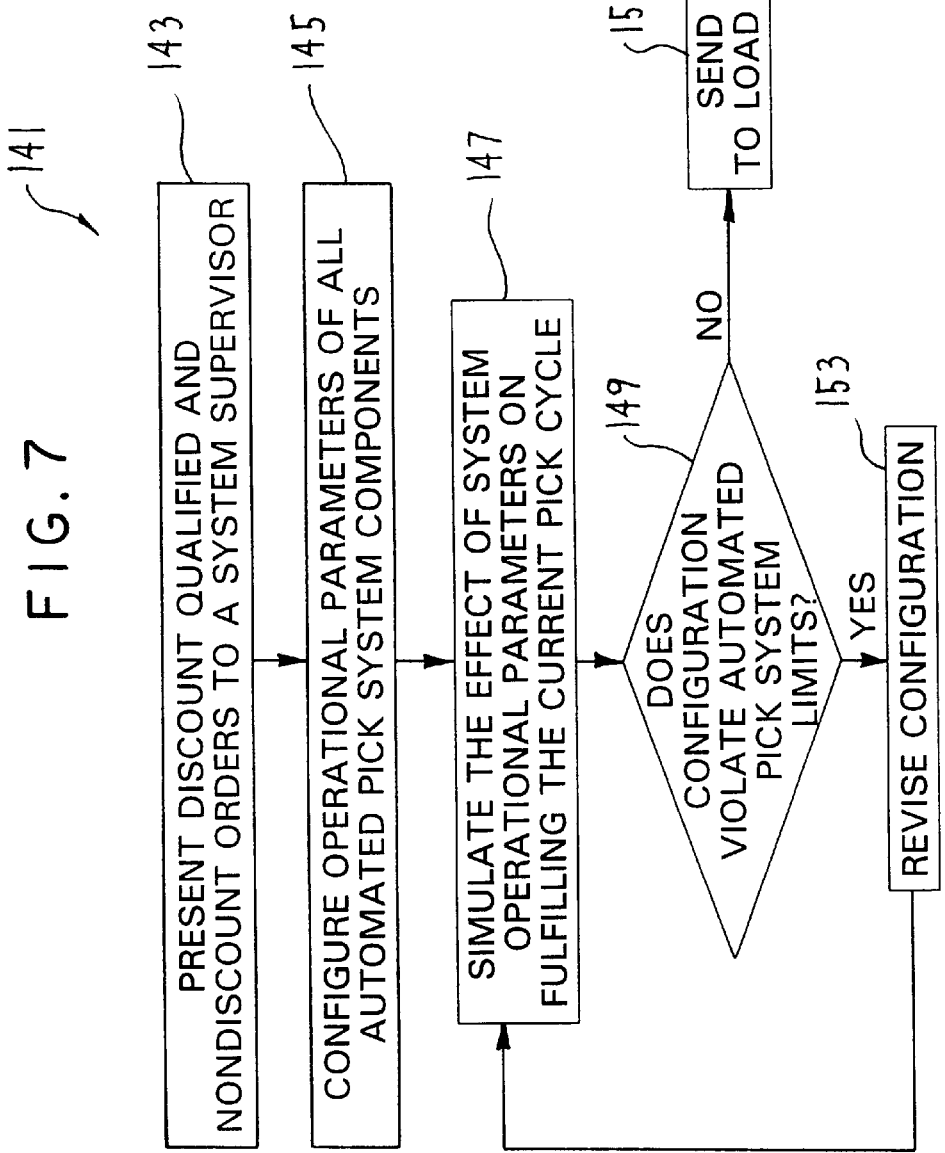

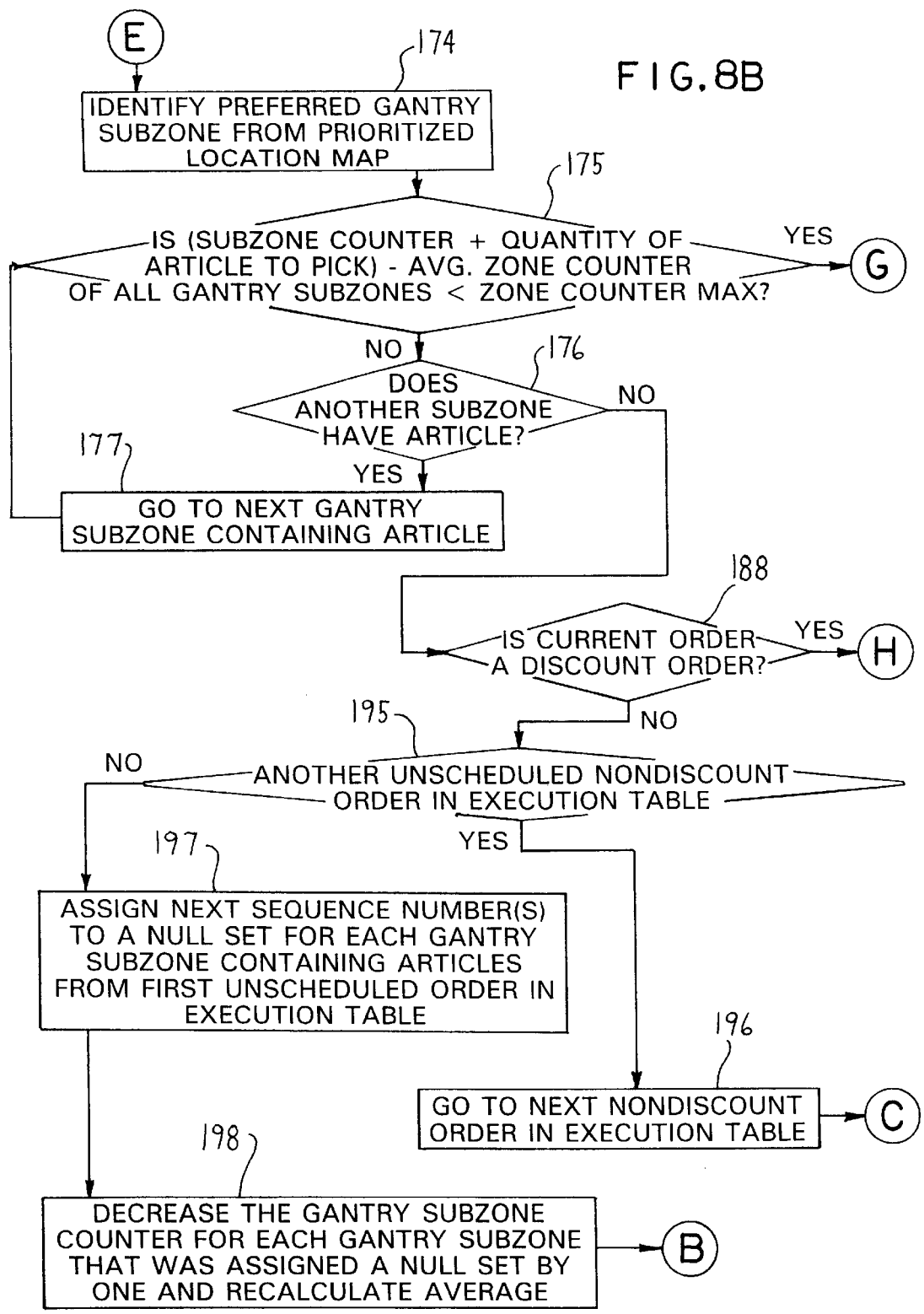

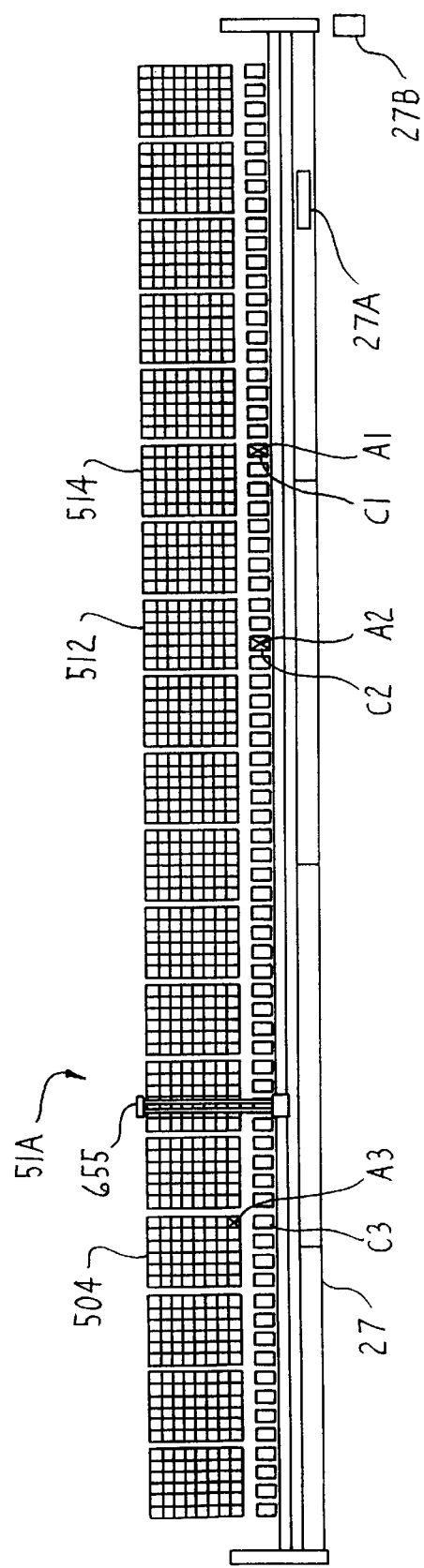

AUTOMATED ORDER PICK PROCESS

CROSS REFERENCE TO RELATED APPLICATION

This is a continuation-in-part of application Ser. No. 09/019,274, filed Feb. 5, 1998, now U.S. Pat. No. 6,061,607.

FIELD OF THE INVENTION

This invention relates to an automated order pick process and, more particularly, a control method which automatically and efficiently fills a large quantity of orders, many of which contain multiple but different articles, by controlling devices which can respectively supply both high as well as low demand articles.

BACKGROUND OF THE INVENTION

Numerous control methods for automated storage and retrieval systems have been developed, particularly for permitting storage and retrieval of containers of articles such as cases or boxes in a warehousing arrangement. Such control methods usually inventory and locate the containers in horizontally and vertically disposed storage racks. The control method controls an automated stacker crane or the like which is movable horizontally and vertically along one side of the storage rack and has a carton transfer mechanism associated therewith which can remove the carton or container from the storage rack and deliver it to a shipping or use location. Such arrangements are conventionally tied to a central controller or computer which stores the inventory locations and control instructions for the stacker crane. When an order for a particular container is received in the controller, it moves the stacker crane to the associated position in the storage rack and retrieves the particular container. Such systems are generally suitable for handling only a low quantity of containers or articles, and typically handle large containers and not individual small articles.

Dispensers which are particularly suitable for dispensing a high volume of high-demand articles are also known, and examples thereof are disclosed in U.S. Pat. Nos. 4,000,821 and 5,271,703. The structural complexity and overall cost of these dispensers, however, do not make them cost effective for handling articles and filling orders where the articles are in low demand, particularly where there is a large inventory of different low demand articles from which particular individual articles must be selected to fill an order.

Accordingly, there is a need for an automated storage and retrieval system which can handle a large quantity of different low demand articles, typically small articles, and more desirably a combination of high, medium and low demand articles, in large enough quantities to automatically dispense particular articles needed to fulfill a large number of orders. In view of this need, the Assignee hereof developed an improved order pick system as described in application Ser. No. 09/019,274 (hereafter the '274 application), filed Feb. 5, 1998, and the entirety of the disclosure of the '274 application is herein incorporated by reference. A brief description of the system of the '274 application is provided below in conjunction with FIGS. 18 and 19.

Referring to FIGS. 18–19, the automated article storage and retrieval system 610 includes an order pick system 611 which cooperates with an article storage system 612. The filled orders from the pick system 611 are typically supplied to a packaging station 613. The system 610 also includes a conveyor system 645 for moving article-receiving orders through dispensing zones 641, 642, 643, and a tote replenishment station 614 wherein stacks of typically small articles (such as CDs, video cassettes, etc.) are moved into storage cells in boxlike totes. The storage system 612 stores individual articles 616 in vertical stacks within cells 618 which in turn are defined within movable containers or storage totes 630 (FIG. 19). Each stack normally contains only identical articles stacked vertically on top of one another.

The storage totes 630 are disposed on tiered rows of shelves defined by storage racks 631 associated with the storage system 612, and can be accessed using automated storage and retrieval devices 635 such as conventional stacker cranes or carousels. The totes 630, in the illustrated arrangement, provide articles to three different dispensing zones 641, 642, 643 which respectively handle low demand articles, high demand articles, and high/moderate demand articles. The high demand zone 642 contains known high-speed dispensers for dispensing the articles onto an order-collecting conveyor system. The high/moderate demand zone 643 contains moderate demand dispensers for dispensing articles onto the order-collecting conveyor system 645. The low demand dispensing zone 641 contains a gantry-type dispenser system 655 which can access a large number of different low demand articles 616 contained in pick totes 500 disposed in preassigned locations adjacent the order-collecting conveyor system 645 to permit transfer of individual articles from the totes to preassigned order collecting areas on the conveyor system (FIG. 19). The low demand picking zone 641 typically involves several gantry subzones 652 arranged along the conveyor system 645. Each gantry subzone 652 includes a respective gantry mechanism 655 and a plurality of active pick face totes 500 supported along at least one side of the conveyor system 645, and the cells 618 of the pick face totes have a plurality of articles stacked therein which can be accessed by the gantry mechanism 655. The gantry mechanism 655 moves to a specific cell of a specific pick face tote, removes the ordered article 616 from the cell 618, and transfers the article for deposit onto a preassigned area of the conveyor system 645. This article retrieval process is repeated several times within one subzone and sequentially within the several subzones as the conveyor system moves the order-collecting areas sequentially through the subzones to permit filling of a single order with the desired low demand articles. The conveyor system 645 may also move the order receiving area sequentially through the high and moderate demand dispensing zones 642, 643, if necessary, to receive ordered articles from these zones into the preassigned order receiving areas. After the orders have received the articles from the order fulfillment system 611, then the order receiving areas are sent to the packaging system 613 for packaging and shipping.

It is an object of this invention to provide a method for controlling an article storage and retrieval system which can efficiently and substantially automatically fulfill a plurality of orders with a plurality of low-demand articles selected from an inventory containing a very large number of different low-demand articles. A further object of the invention is to provide a method, as aforesaid, wherein stacks of articles are efficiently handled and located within the article storage and retrieval system so that movement of order fulfillment devices are efficiently operated. A still further object of the invention is to control the fulfillment of orders requiring high, moderate and/or low demand articles.

In the controlling process of the present invention, according to one aspect thereof, a large number of different orders each identifying one or more different type article thereon are inputted into a control system to create an order list for the next order fulfillment cycle. The individual articles stored in the system are also assigned an identification code which reflects the frequency of demand of the specific type article, which identification code is automatically determined from historical order analysis. The different type articles are contained in stacks disposed in individual cells of upwardly-opening containers known as totes. A first plurality of active pick totes are associated with individual article dispensing zones, and other inactive pick totes are disposed in replenishment zones positioned adjacent the individual dispensing zones. Based on historical order analysis, and an analysis of the available articles contained in the active totes, sufficient articles are transferred into inactive totes so as to anticipate the next order list, and the inactive totes are interchanged with selected active totes so as to position needed articles in the dispensing zones prior to start-up of the next order fulfillment cycle. The controlling process positions the different type articles in the totes according to the demand frequency identification, and positions the active pick totes in a series positional relationship through the dispensing zone which is based on an analysis of the different demand frequency identifications so as to provide for substantially uniform load level distribution (i.e., uniform dispensing of individual articles from a dispensing zone), taking into account the relative movements of the dispensing device and the order receiving device which are cooperatively associated with the series of active totes disposed in the dispensing zone. The controlling method maintains an identification of the quantity and location of each different type article, including those in storage totes and those contained in active or inactive totes as disposed respectively in the dispensing zone and the associated replenishment zone, thereby permitting automated control over not only the replenishment of different type articles to and from the dispensing zone, but the actual picking of different type articles from the dispensing zone for filling the individual orders on the order list.

Other objects and purposes of the invention will be apparent upon reading the following specification and inspecting the accompanying drawings.

BRIEF DESCRIPTION OF THE DRAWINGS

FIGS. 3A and 3B are flow charts which illustrate the gantry picking zone replenishment steps.

FIG. 5A, 5B and 5C are flow charts which illustrate the inventory verification and gantry zone adjustment steps.

FIG. 6 is a flow chart which illustrates the group orders by shipping method steps.

FIG. 7 is a flow chart which illustrates the picking resource loading steps.

FIGS. 8A, 8B, 8C, 8D, and 8E are flow charts which illustrate the level loading and order synchronization steps.

FIGS. 16A to 16D show schematic plan views of a gantry subzone.

DETAILED DESCRIPTION

System Overview

Figure 12:
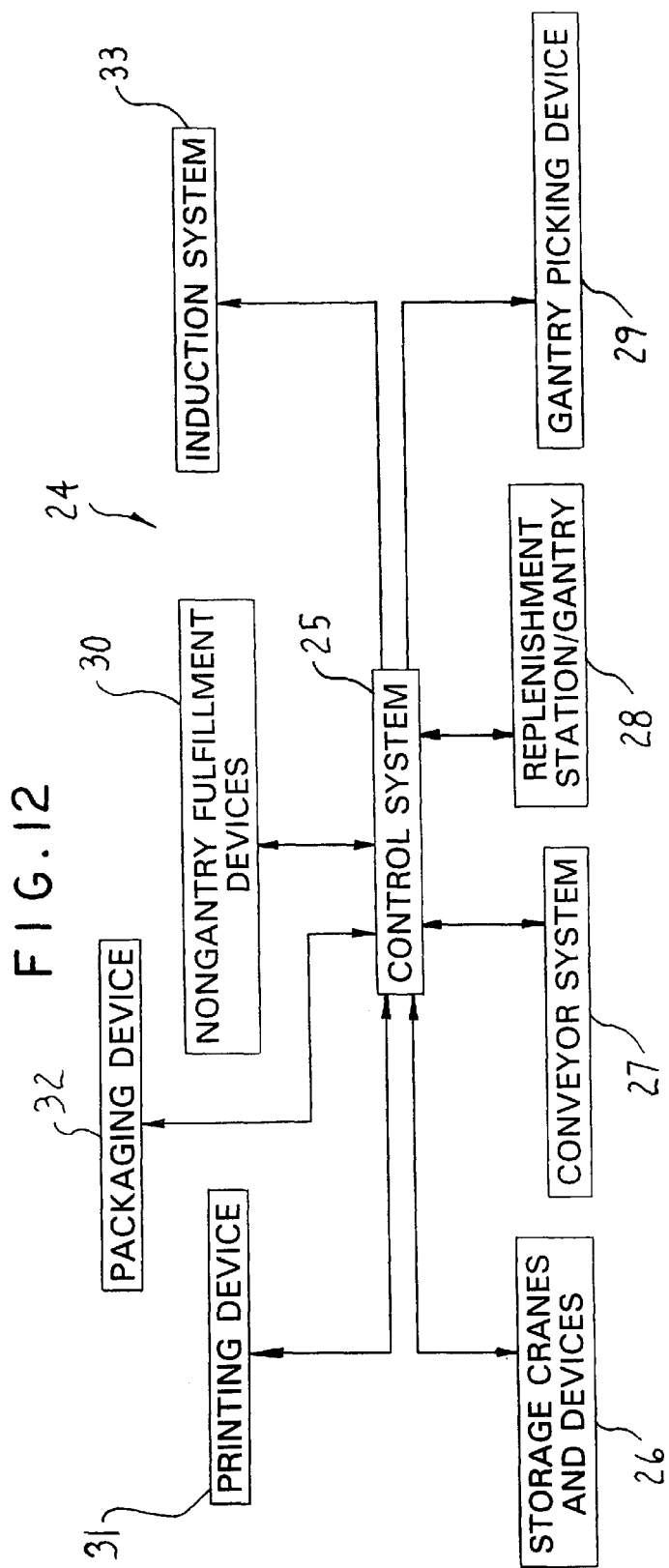
FIG. 12 is a schematic view of an order picking system which employs the present inventive control method.

The method of this invention is adapted for use with an automated article storage and order fulfillment system 24 (FIGS. 12–14) which generally corresponds to the automated storage and retrieval system disclosed in the '274 application. The fulfillment system 24 includes a control system 25 in which the method is performed. The control system 25 includes a general purpose computer system that has at least one computer for controlling the method steps, and may have a plurality of networked computers dedicated to specific steps so that these steps can be parallel processed.

Figure 13:
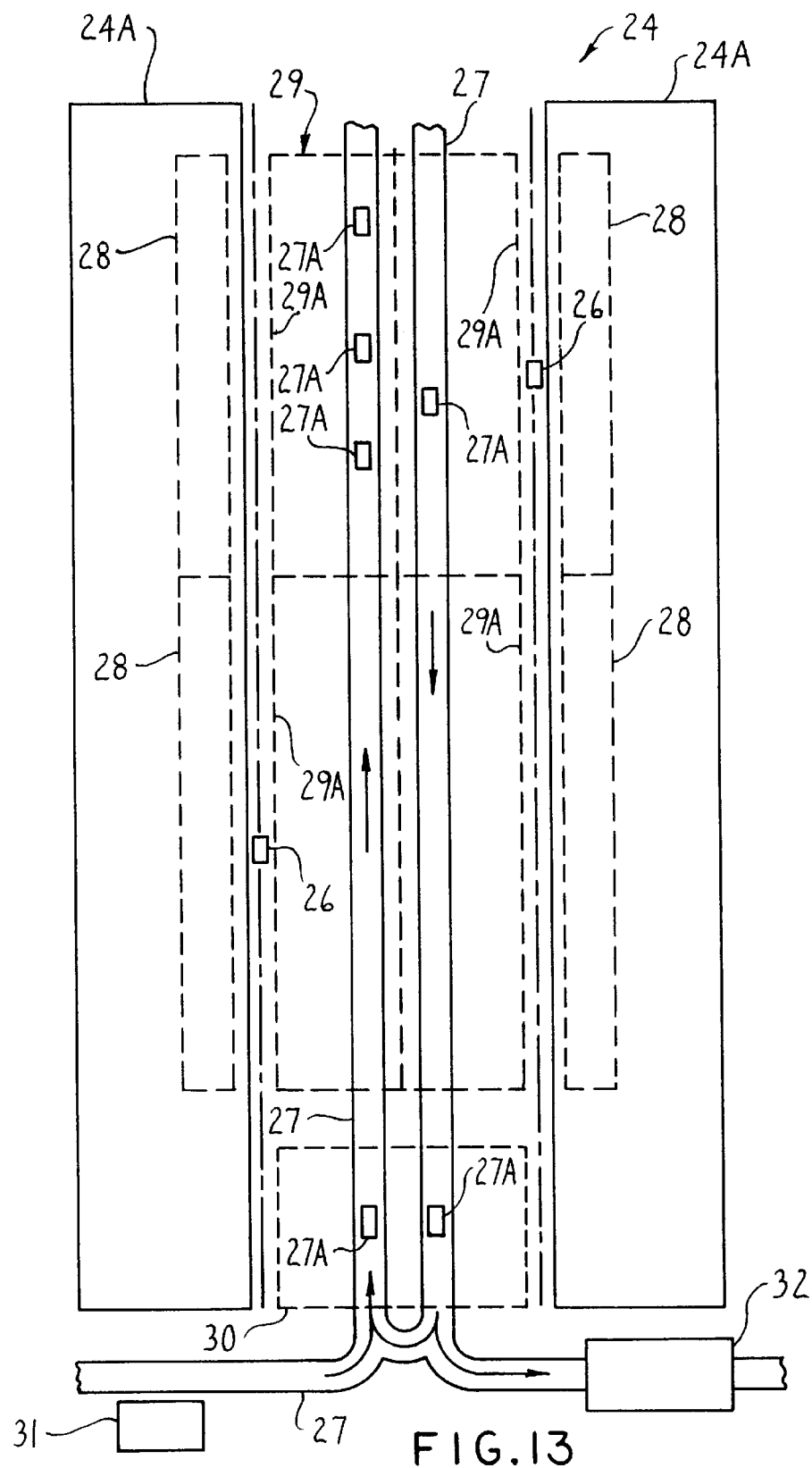
FIG. 13 is a diagrammatic view of the article storage and order fulfillment system.
Figure 14:
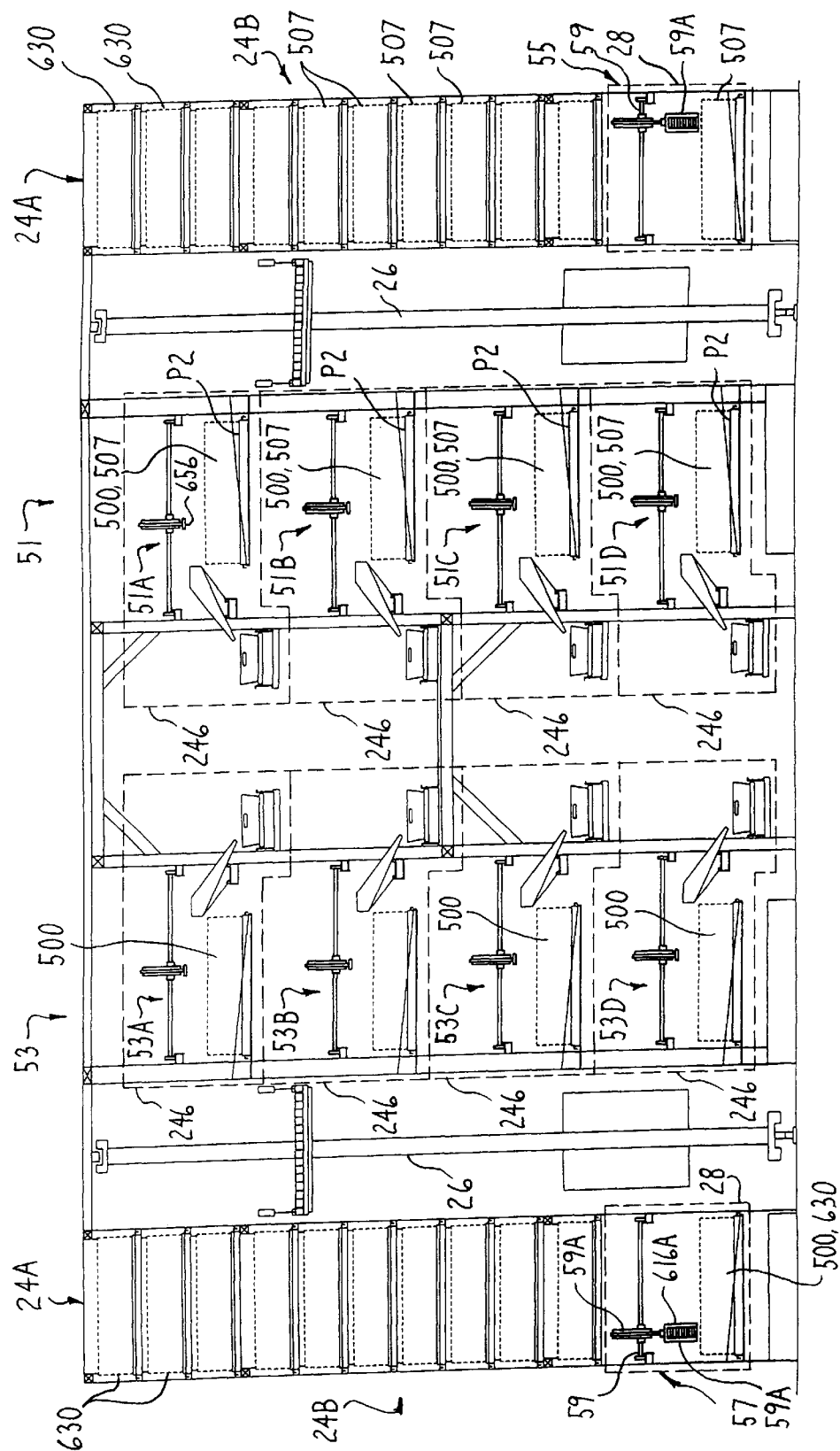
FIG. 14 is a cross sectional view of the gantry pick zone.

The order fulfillment system 24 includes a storage subsystem 24A which has storage/retrieval vehicles 26 to move totes from defined storage locations in tiered storage racks throughout the warehouse in which the system 24 is housed (FIG. 13). The totes are upwardly opening, boxlike containers each adapted to contain a plurality of vertical stacks of articles therein arranged in an x-y grid as disclosed in the '274 application. Each tote 500, 630 has a unique identifier, e.g. alphanumeric sequence and/or bar code, which is used by the control system 25 to track the totes in the order fulfillment system 24. The vehicles 26 may include conventional automated stacker cranes that automatically retrieve and place totes 500, 630 in response to commands issued by the control system (FIG. 14). At least one replenishment station 28 is provided which transfers stacks of articles between storage totes 630 and pick face totes 500 as directed by the control system 25. A conveyor system 27 extends through the order fulfillment system 24 to provide defined order receiving areas 27A for movement through gantry picking zone 29 and nongantry fulfillment zone 30 (FIG. 13). The conveyor system 27 may have a vertical serpentine arrangement as disclosed in the '274 application so that the gantry picking zone 29 includes vertically and horizontally aligned gantry picking subzones 29A. The order receiving areas 27A may be ordered article receiving bins or uniquely defined sections of the conveyor. The gantry picking zone 29 is adjacent a portion of the conveyor system 27 and removes individually ordered low and/or moderate demand articles from pick face totes in gantry subzones 29A and places the ordered articles into the order receiving area 27A that is assigned to the order requiring that article (FIG. 13). The nongantry fulfillment zone 30 dispenses high demand articles into the assigned order receiving area 27A.

The control system 25 instructs a printing device 31 to begin preparing the required printed documents and delivers them to the assigned order receiving area 27A. In addition, the control system 25 instructs a packaging station 32 to package the printed documents and completed orders from the order receiving areas 27A into packaging suitable for shipment. An induction system 33 (FIG. 12) supplies stacks of articles into the order picking system 24 from a remote bulk storage location (not shown).

The storage/retrieval vehicles 26, conveyor system 27, replenishment station 28, gantry picking zone 29, nongantry fulfillment zone 30 (which can include A-frame and bombardier type dispensers as disclosed in the '274 application), printing device 31, packaging device 32, and induction system 33 communicate with the control system 25 such as through suitable electrical communication connections, for example local area networks which can include fiberoptic, token ring, or ethernet type networking. Thus, all the devices are connected to or communicate with the control system 25, such as by an electrical connection. Each of the individual devices, subsystems or replenishment/storage devices may have computer and/or programmable logic controllers directly associated therewith which are all connected through the local area network to the main network computer of the control system.

Figure 1:
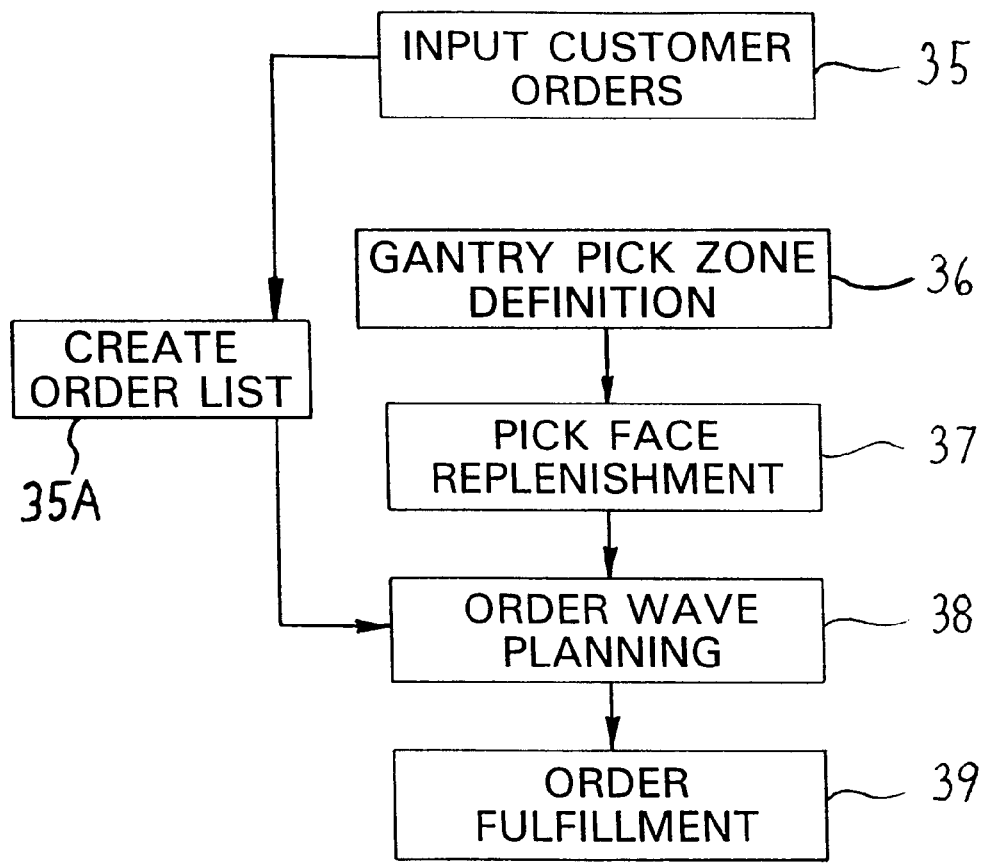
FIG. 1 is a flow chart which illustrates an overview of the present inventive process.

Referring to FIG. 1, there is shown a flow chart which provides an overview of the present control method. Customer orders, each of which includes at least one article, are continuously input (step 35) into the control system 25 and are compiled into an order list (step 35A) which is stored in a computer memory device. The orders may be manually input by keyboarding, and/or electronically input by scanning or direct computer communication. The order list is a random sequential list with the first inputted order being at one end of the list and the last inputted order at the other end of the list. At a defined time, the control system 25 freezes the customer order list for one order filling cycle (i.e., an order pick cycle) and prevents additional orders form being added thereto, at which time the control system 25 may begin compiling a new order list for the next order pick cycle. The defined list cutoff time is preferred to be a select time of day, or may be the time at which there are a determined number of orders in the list. For example, if the control system is set to run one order fulfillment cycle (i.e., one pick cycle) per day, then the cutoff time could be set for noon each day. However, the cutoff time is a variable system parameter that can be set by the system operator. Once the customer order list is frozen by the control system, then the control system performs order wave or batch fulfillment planning (step 38), as described below.

While the customer orders are being input (step 35), the control system directs the replenishment station 28 to replenish the inactive pick totes 500 currently at the replenishment station 28 based upon a demand trend line determined from prior order fulfillment cycles. The replenishment of the inactive pick totes 500 includes two sequential steps, namely gantry zone pick face definition (step 36) and pick face replenishment (step 37). Once the pick face replenishment step 37 is complete, the process proceeds to the order wave planning (order/articles batch sequence) step 38 which receives data from the order list (step 35A) and pick face replenishment step 37.

The data received by the order wave planning step 38 includes the customer order list and the location and quantity of each article in the replenished pick totes 500. The order wave planning step 38 plans the current pick cycle based on the current order list and the replenished active pick totes which have been inserted into the gantry subzones 29A by the pick face replenishment step 37. Once order wave planning step 38 creates a preliminary fulfillment plan, the control system 25 sends the preliminary fulfillment plan which includes instructions to the nongantry dispensers 30 and an execution table for the gantry dispensers 29 to order fulfillment (step 39) which actually fulfills the orders in the current pick cycle.

The above steps are described in greater detail hereinafter.

Each article 616 has a unique identification code which is input into the control system 25 at the induction station. The article identification code may be a alphanumerical sequence, e.g. a bar code, that can be scanned into the control system. The control system 25 stores the article identification code in conventional computer memory and correlates the articles in the customer orders to the article identification codes.

Pick Face Definition

Figure 2:
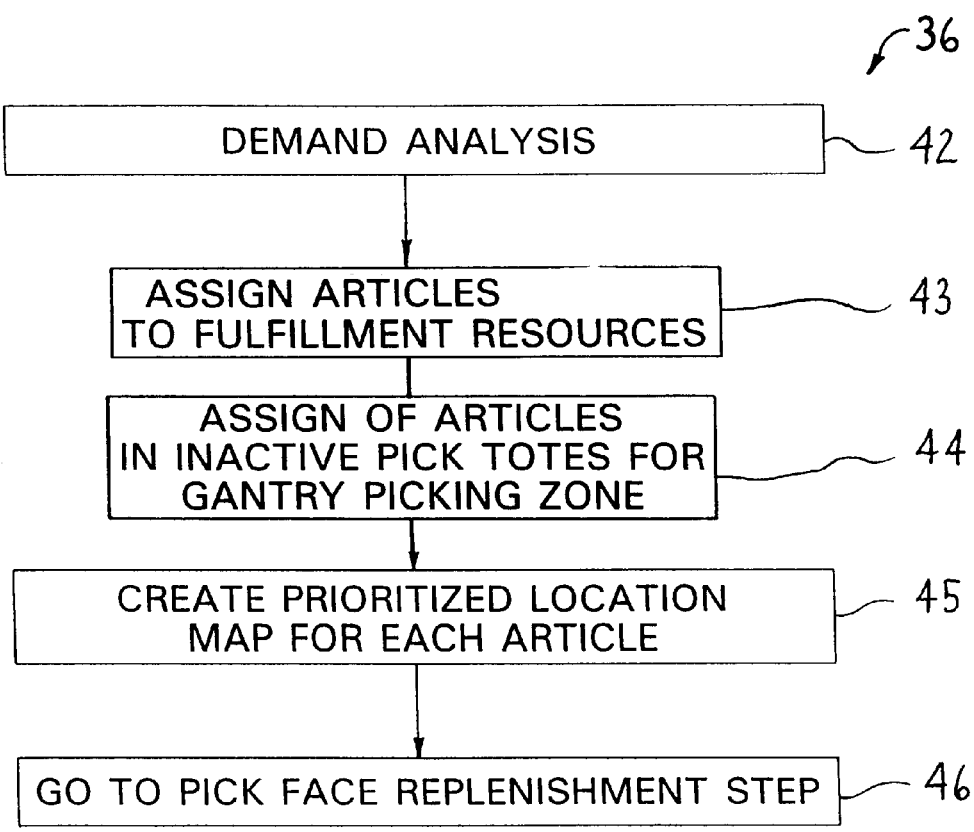
FIG. 2 is a flow chart which illustrates the gantry picking zone definition steps.

The gantry zone pick face definition of step 36 (FIG. 2) includes the steps of article demand analysis (step 42), assignment of articles to dispensing resources (step 43), arrangement of articles (i.e. totes) in the gantry picking zone (step 44), and creation of a prioritized location map for each article (step 45).

The demand analysis step 42 assigns each article a velocity category. The term "velocity" is used to designate the frequency that a particular article is ordered (i.e., demand for an article). The control system uses the velocity category to assign articles to a dispensing/fulfillment resource (e.g. gantry dispenser 29, nongantry dispenser 30, storage tote 630, pick tote 500, etc.) and the placement of that article in the assigned dispensing resource. Demand analysis is based on a demand trend line which is based on the calculated average of the order frequency for a particular article over the previous "N" days or pick cycles plus a standard deviation. The demand trend line defines the predicted order velocity of each article for subsequent pick cycles. The rate of demand change for a particular article will determine the number of days "N" over which the demand is averaged to determine the demand trend line. For example, if an article has a relatively steady demand trend line over "IN" days and a low standard deviation, then the "N" value may be increased. Once the demand trend line is determined, each article is classified in terms of its velocity based upon velocity codes which are assigned to each particular article. For example, a velocity category code "A" is assigned to a first grouping of different articles which are of highest popularity (i.e. highest demand) as determined by the demand trend line, a velocity category code "G" is assigned to a second grouping of different articles which are popular but of less demand than the "A" articles, as also determined by the demand trend line, and a velocity category code "M" is assigned to a third grouping of remaining articles which contains any article less popular than the second article grouping, as also determined by the demand trend line. One possible example of a delimitation of the "A" velocity, "G" velocity and "M" velocity categories is the most frequently ordered 1600 articles being in the "A" category (i.e., high or moderate demand articles), the next popular ordered articles ranked 1601 to 9221 being in the "G" category (i.e., low demand articles), and any article ranked greater than 9221 (i.e., a very low frequency of demand) being in the "M" category.

The demand analysis further breaks down the velocity category codes into velocity subcodes. The "A" velocity code is, in a preferred embodiment, broken down into subgroups such as quartiles A1 to A4, wherein the top quartile "A1" represents the highest ranked or demanded "A" velocity articles and the lowest quartile "A4" represents the lowest ranked or demanded "A" velocity coded articles. Using the above numerical example of 1600 different "A" velocity articles, the "A1" subcode is assigned to the highest frequency article subgroup (1–400), the "A2" subcode is assigned to the next highest frequency article subgroup (401–800), the "A3" subcode is assigned to the next highest frequency article subgroup (801–1200), and the "A4" subcode is assigned to the lowest frequency group (1201–1600).

Figure 19:
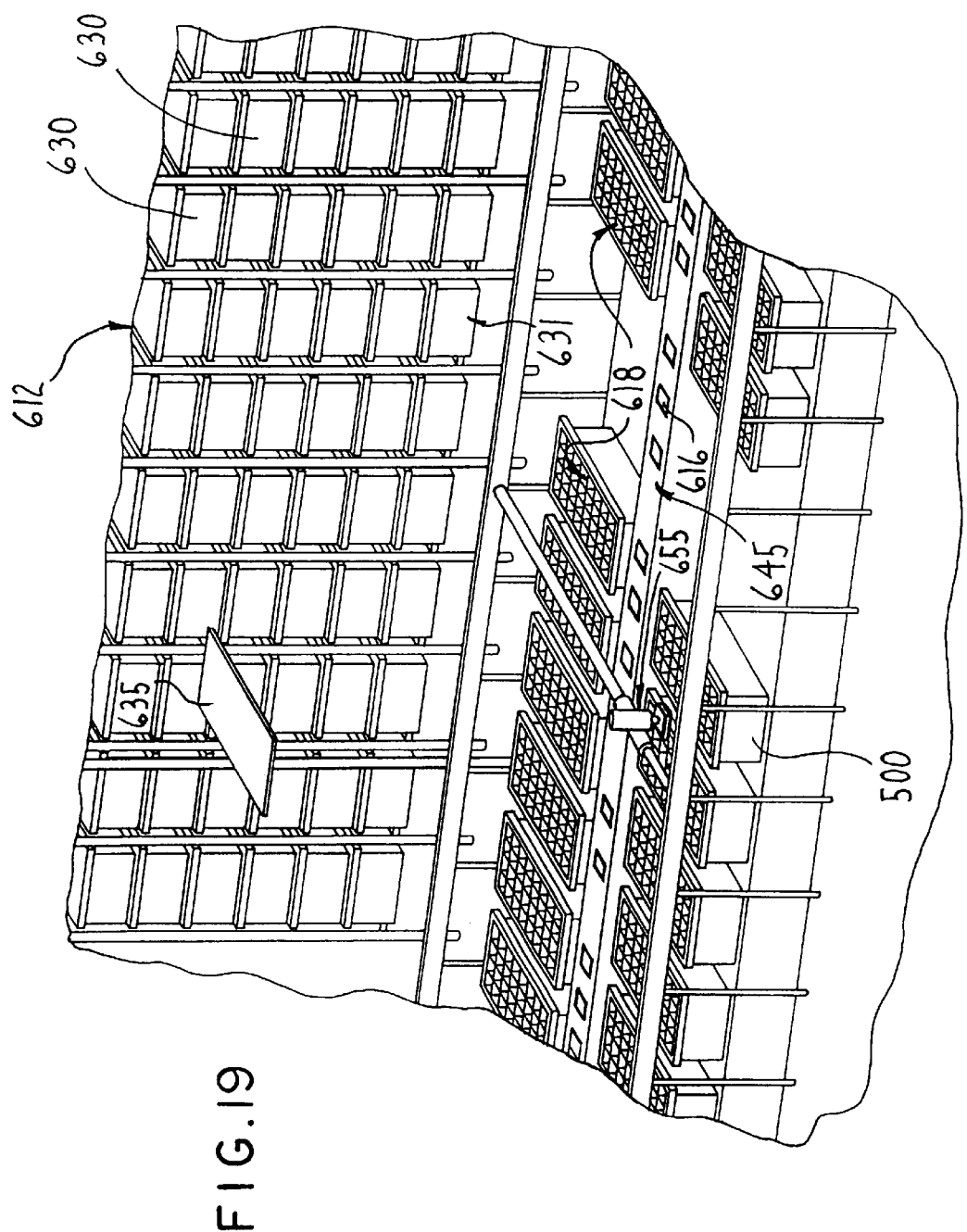
FIG. 19 is a diagrammatic view of a storage system and a low demand gantry type dispensing system.

The "G" velocity category codes can be broken down into subcodes by specific user-defined ranges or into a number of predefined segments of the "G" velocity coded articles. For example, the "G" velocity code may be broken down into eight subcodes "G1 to G8". However, it will be recognized that the "G" velocity coded articles can be broken down into any desired number of subcodes. The most popular (i.e. highest demand) "G" velocity code articles are assigned the "G1" velocity subcode, the next most popular "G" velocity code articles are assigned the "G2" velocity subcode, etc., and the least popular "G" velocity code articles are assigned the "G8" velocity subcode. One convenient range definition is to define the subcodes G1–G8 by the number of article stacks used per day of order fulfillment processing, which processing includes at least one article pick cycle per day. The article stack is the amount (i.e. number) of a particular article that can be placed in one cell or compartment 618 in a tote 630 (FIG. 19). Thus, for example, the "G" velocity codes may be broken down into subcodes as follows:

| VELOCITY SUBZONE | ARTICLE QUANTITY |
|---|---|
| G1 | >4 stacks per day |
| G2 | >3 and ≦4 stacks per day |
| 63 | >2 and ≦3 stacks per day |
| G4 | >1 and ≦2 stacks per day |
| G5 | ½ and ≦1 stack per day |
| G6 | >⅓ and ≦½ stack per day |
| G7 | >⅕ and ≦⅓ stack per day |
| G8 | ≦⅕ stack per day |

The control system 25 uses the velocity codes and subcodes to assign articles to fulfillment resources (step 43) including the dispensers of zone 30 and the totes of zone 29. Assignment step 43 performs three functions, namely assigns articles to the corresponding dispensing device, assigns a velocity code or subcode to each storage tote, and assigns a velocity subcode to each pick totes.

First, step 43 assigns the high volume "A" coded articles to the high volume nongantry dispensers of zone 30, the low volume "G" coded articles to the gantry dispensers of zone 29, and the "M" coded articles to a manual order fulfillment station (not shown). Thus, the high volume "A" articles will be dispensed by the high volume nongantry dispensers 30. The "G" articles having a velocity or demand frequency less then the "A" articles require a dispenser capable of handling a greater number of article types each having lower individual frequency of selection than the "A" coded articles. The gantry dispenser 29 can handle a significantly greater number of article types than the nongantry dispensers 30. For example, the nongantry dispensers 30 may handle up to 1600 different articles and thus typically handle the "A" articles, whereas the gantry dispensers 29 may handle up to at least 7621 different articles, and thus handle the "G" coded articles. Therefore, the gantry dispenser 29 may handle at least three to five times the number of different articles compared to the nongantry dispenser 30.

Second, the control system 25 assigns a velocity code to each storage tote 630 and preferably only allows stacks of like coded articles to be stored in that storage tote, which storage totes 630 store stacks of articles therein in a local storage location within the storage system 24A (such as a storage rack), which location is automatically accessible to the movement vehicle 26 (FIG. 14). Thus, a storage tote 630 having an "A" velocity code will only store stacks of "A" coded articles therein and a storage tote having a "G" velocity code will only store stacks of "G" coded articles therein. Movement of storage totes 630 by the vehicle 26 is thus minimized, and in fact movement of the storage totes between the replenishment station for the nongantry dispensers 30 and the replenishment station for the gantry dispensers 29 is substantially eliminated.

The storage tote containing stacks of "A" coded articles preferably has only a single article type therein. Thus, the vehicle 26 need only move that tote containing stacks of "A" coded articles to a location adjacent the nongantry dispenser 30, whereat a nongantry dispenser replenishment device can move stacks of articles from the storage tote 630 into an assigned dispensing cell chamber in the high volume nongantry dispenser 30.

The storage totes 630 containing stacks of "G" velocity coded articles may contain more than one type of "G" article if the article type stored therein does not occupy the entire tote. However, storage totes 630 containing a plurality of "G" article types should be minimized and, if a sufficient number of storage totes are available, then each storage tote containing stacks of "G" coded articles preferably stores only one article type therein. If it is necessary to store a plurality of "G" article types in one storage tote, then the storage tote should store stacks of similarly subcoded articles, i.e., all G1 articles, etc.

Third, step 43 assigns a velocity subcode to the pick totes 500. The pick totes 500 are exclusive to the gantry dispenser 29 and the associated replenishment station 28, i.e. the pick totes 500 are either being utilized in a current pick cycle (i.e., an active pick tote) or being replenished for the next pick cycle, (i.e., an inactive pick tote), whereas storage totes 630 store articles in the storage system 24A and provide stacks of articles to the replenishment stations 28 or to the nongantry devices. The pick totes 500 and storage totes 630 can, however, be structurally identical.

The velocity subcodes assigned to the pick totes 500 are the "G" series of subcodes, i.e. "G1–G8". The pick totes 500 are replenished by stacks of articles corresponding to the subcodes, and the subcoding of the articles stored within a pick tote 500 determines the position of the pick tote in the gantry pick subzones. In the alternative, and preferably, the velocity subcode assignment to each pick tote 500 is updated based on the lowest velocity subcode of an article stack stored therein. Thus, if a pick tote 500 has stacks of "G1" and "G2" articles stored therein, then the pick tote has a velocity subcode of "G2".

The control system 24 then arranges the articles in the gantry picking (dispensing) zone 29 (step 44). Step 44 includes arranging the stacks of articles within the cells of the inactive pick totes 500 whereby each inactive pick tote has stacks of articles with the same or similar "G" velocity subcodes assigned thereto.

The "G" velocity coded articles may require several stacks of a particular article to be present in the gantry picking zone 29 so as to fulfill the entire predicted requirement for that article as determined by the demand trend line for that article in the next pick cycle. The articles 616 must be arranged in the gantry subzones 29A and, where there are multiple stacks of like articles, then the like articles are preferably distributed among multiple gantry subzones 29A adjacent a single replenishment station 28 that replenishes those gantry subzones which receive the stacks of identical articles.

Figure 15:
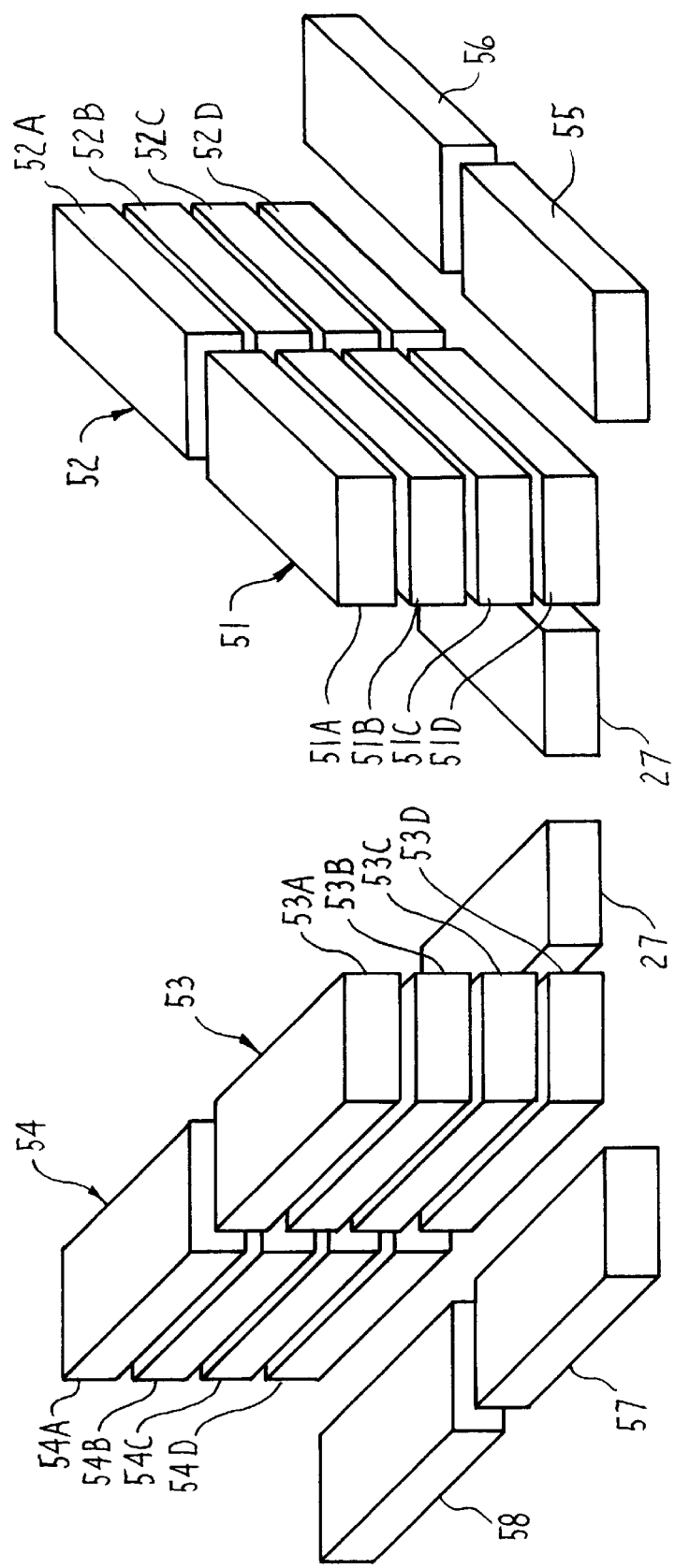
FIG. 15 is a view of the replenishment zones and the gantry pick subzones.

Referring to FIG. 15, there is shown a schematic representation of sixteen gantry subzones which are divided into four groups 51, 52, 53 and 54. Each group includes plural, here four, gantry subzones, respectively designed by group number and suffixes A, B, C, or D, which are positioned vertically one above the other, although the subzone could also be disposed in horizontally adjacent or aligned relationship. The groups 51–54 are replenished by respective replenishment stations 55, 56, 57, and 58. Replenishment stations 55 and 57 are shown in FIG. 14 and each replenishment station includes a replenishment device 59, for example a gantry, which has an article stack gripping head 59A that removes article stacks 616A from storage totes 630 and places the article stacks 616A into assigned cells in inactive pick totes 500. These totes 630 and 500 at the replenishment station are preferably disposed in horizontally adjacent relation, such as on a horizontal support shelf or rack. The control system 25 commands the tote movement vehicles 26 to move the storage totes and inactive pick totes into the replenishment stations. While the illustrated embodiment shows sixteen gantry subzones 51A–51D, 52A–52D, 53A–53D, 54A–54D and four replenishment stations, it is within the scope of this invention to have any number of gantry subzones, groups of gantry subzones, and replenishment stations. If a first "G1" velocity subcoded article, which for purposes of explanation requires four identical article stacks to meet the predicted demand for that article, is replenished into inactive pick totes at replenishment station 55, then one article stack will be placed in inactive pick totes 500 destined respectively for gantry subzones 51A, 51B, 51C and 51D. Thus, the storage tote 630 which contains a plurality of the first G1 article stacks need only be positioned in replenishment station 55 and not in any of the other replenishment stations 80 as to provide the quantity of first "G1" article needed for replenishment. This results in a reduced number of storage tote movements by the vehicles 26 which transport the storage totes 630 to and from the required replenishment station.

Each pick tote 500 in a gantry subzone group has a velocity designation which governs the assignment of articles to that tote. Thus, pick totes 500 containing lower velocity articles may not need to be replaced (i.e., removed from the gantry subzone or pick face) between every order pick cycle, and thus can remain in the gantry subzone because their article supply will be depleted less rapidly and will contain enough articles for the next order pick cycle as determined by the demand trend line. For example, pick totes that contain only velocity subcode "G8" articles may remain in the gantry subzone for more than one pick cycle. Of course, the replenishment of articles also depends on the actual number of specific articles that were picked during the previous pick cycle.

The arrangement of articles in the gantry picking subzone (step 44) also includes assigning pick totes 500 to specific positions or locations within the respective gantry subzones. Actual movement of inactive pick totes 500 from local storage adjacent the replenishment stations 55–58 is performed by the pick face replenishment step 37, which is explained in greater detail below. The designation and positioning of the active pick totes 500 within each gantry subzone 29A is dependent on the velocity subcodes of the articles within each pick tote 500. FIGS. 16A–16D illustrate gantry subzone 51A having plural active pick totes positioned therein for an order picking cycle, which active pick totes are designated 501 to 519 for distinguishing identification purposes. All other gantry subzones 29A are arranged generally the same as subzone 51A, and therefore only a detailed illustration and explanation of subzone 51A is provided with the understanding that the other subzones are similarly organized.

The gantry subzone 51A includes subzone positions P1–P19 whereat active pick totes 501–519 are located. The positions P1–P19 are related to a tote velocity of the pick totes 501–519 which is determined by the velocities of the stacks of articles stored therein. The positions P1–P19 represent the highest velocity tote position as P1 with these sequentially numbered positions then representing numerically descending velocities so that the lowest velocity tote position is represented by P19. The active tote position layout shown as an example in FIG. 16A has the lowest frequency position P19 at or adjacent the midpoint of the subzone 29A with nine tote positions upstream and nine tote positions downstream thereof. Downstream and upstream are directions defined by the conveyor movement direction, which is shown at 27C in FIG. 16A. The next lowest frequency position P18 is downstream adjacent position P19. The two highest frequency positions P1, P2 are in the downstream half of the tote positions with three tote positions therebetween. The second highest frequency position P2 is downstream and adjacent the second lowest position P18. The highest frequency position P1 is located substantially at the midpoint of the downstream half of the tote positions, and is shown as four positions from the downstream end of the subzone and is four positions downstream the second highest frequency position P2. The third highest frequency position P3 is adjacent and upstream of the lowest frequency, middle position P19. The fourth highest frequency position P4 is in the downstream half in the second position from the downstream end. The third lowest frequency position P17 is between the first and fourth highest frequency positions P1 and P4. The fifth highest frequency position P5 is four positions downstream from the upstream end and five positions upstream from the third highest frequency position P3. The positions P1–P19 are spread out through the gantry subzone 29A with the higher frequency positions being spaced from each other. Further, the average frequency position in the upstream half is 9.3 and the average frequency position in the downstream half is 9.7 so that the pick positions are essentially balanced in each half of the gantry subzone.

Figure 16A:
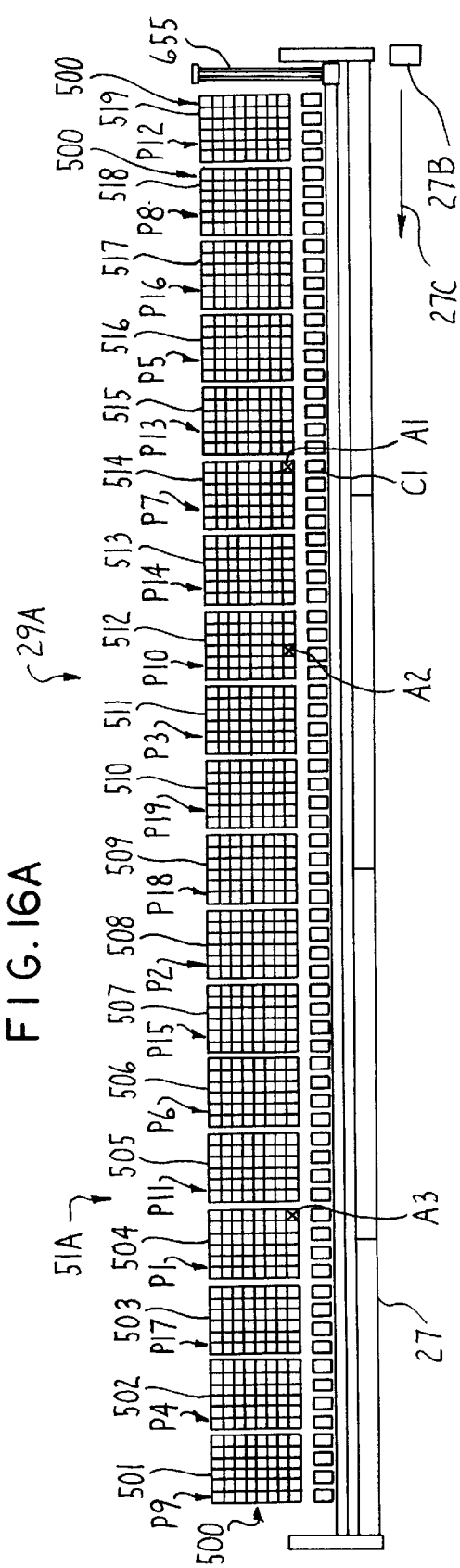

In the disclosed embodiment (FIG. 16A), tote 504 is in position P1 and has the highest velocity articles "G" therein, and tote 510 is in position P19 and has the lowest velocity articles therein. Usually, tote 510 contains no article stacks. The assignment of articles into pick totes begins with the highest velocity (frequency of order) "G1" subcoded article being assigned to the highest velocity tote 504 and then proceeds to the next highest "GI" velocity article assigned to the subzone group until about 90% of the pick tote compartments (i.e., 43 of the 48 compartments in a preferred tote construction) have article stacks therein. The assignment of articles then moves on to the next available tote according to the position which will receive that tote in the gantry subzone. As shown in FIG. 16A, the control system 25 will instruct replenishment station 55 to fill the inactive pick totes in the following order: 504, 508, 511, 502, 516, 506, 514, 518, 501, 512, 505, 519, 515, 513, 507, 517, 503, 509, and 510, which totes will be respectively positioned in positions P1–P19 within the respective gantry subzones. However, if lower activity totes 503, 509, 510 are not required to fulfill the predicted requirement of articles for the next pick cycle, then they are not inserted into the gantry subzone at positions P17–P19. As a result, positions P17–P19 may be left open for gantry pick face adjustment (step 83) without the need for the vehicle 26 to remove an unnecessary pick tote from the gantry subzone as explained below.

Figure 17:
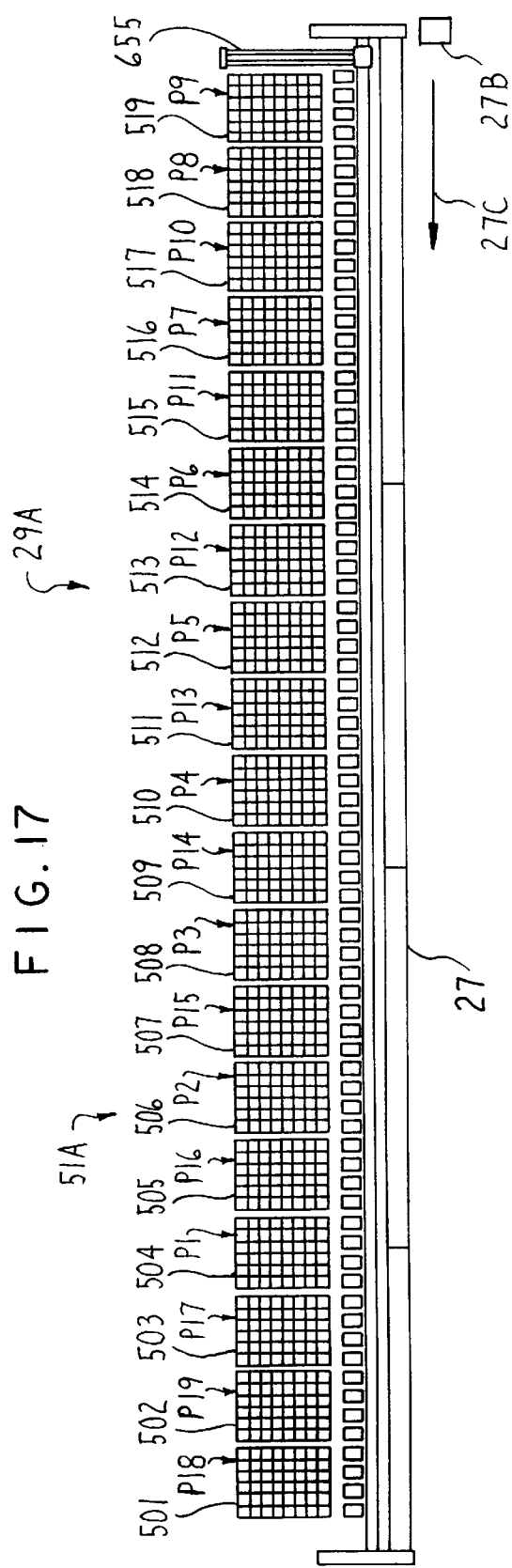
FIG. 17 is a modified view of FIG. 16A.
Figure 18:
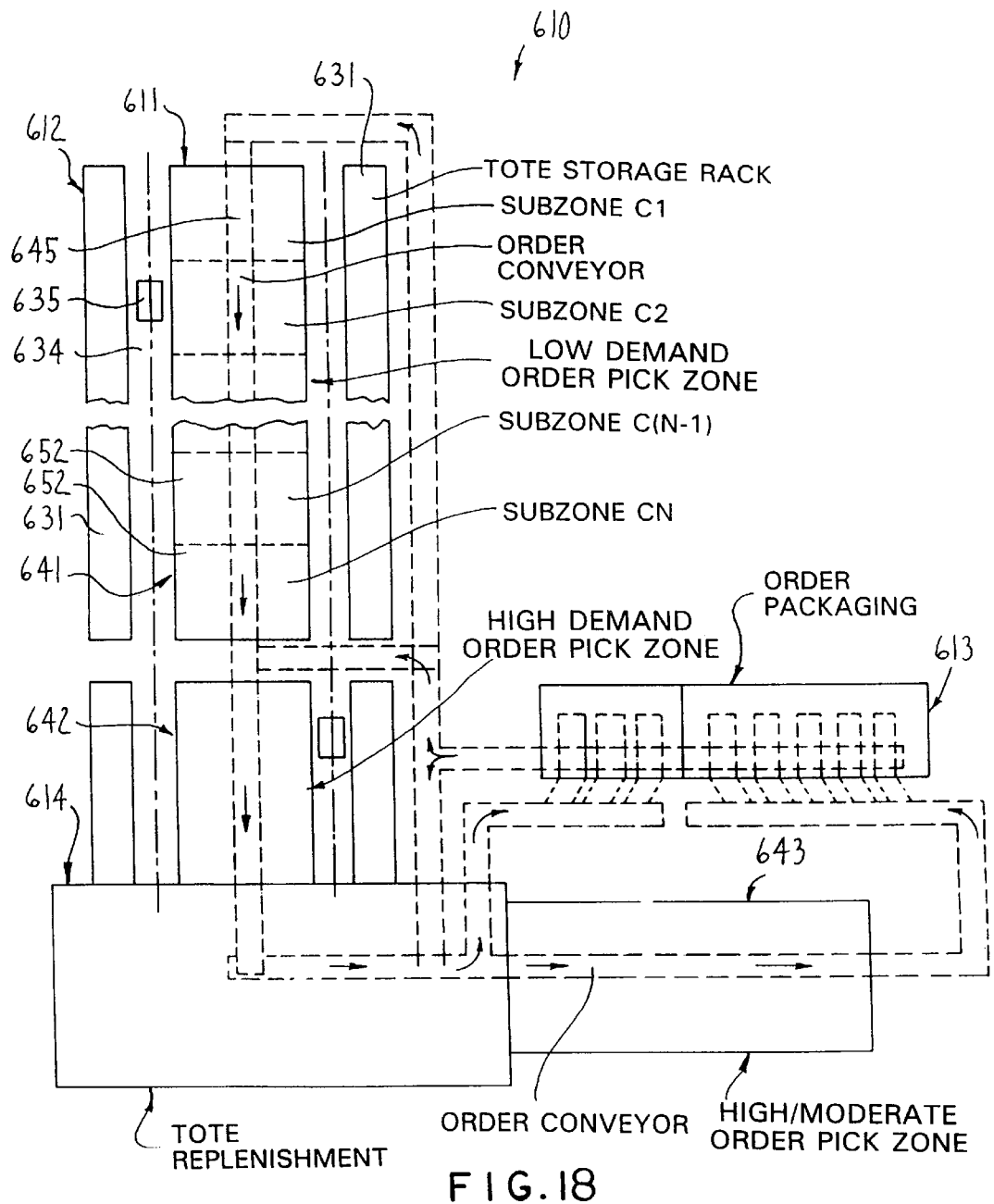
FIG. 18 is a diagrammatic view of an article storage and retrieval system.

A preferred alternative gantry subzone tote position P1–P19 layout is shown in FIG. 17. The sequential number of the pick totes 501–519 remains the same but the positional hierarchy P1–Pl9 is different from the FIG. 16A embodiment. In FIG. 17, the two lowest frequency positions P18–P19 are positioned at the downstream end of the gantry subzone 29A. The third lowest frequency position P17 is upstream adjacent the lowest frequency position P19. The highest frequency position P1 is upstream adjacent position P17. The fourth lowest frequency position P16 is upstream adjacent position P1 and the second highest frequency position P2 follows position P16. Thus, the downstream third of positions P1–P19 includes the two highest frequency positions and the four lowest frequency positions. Beginning with position P1, the positions are sequentially arranged in the upstream direction by skipping the adjacent tote and locating the subsequent lower frequency tote in the position after the skipped tote until the upstream end is reached. Position P8 is located one position downstream from the upstream end of the gantry subzone 29A, and position P9 is at the upstream end. Positions P9–P18 are respectively sequentially positioned in the downstream direction by skipping one adjacent tote. Thus, the assignment of totes to the gantry subzone begin with position P1 and sequentially decrease in frequency in the upstream direction skipping the adjacent tote and continues with position P9 and decreases in the downstream direction skipping the adjacent tote, which was incrementally sequentially positioned in the upstream direction from position P1.

The arrangement of articles in the gantry picking zone (step 44) also includes assigning articles in each pick tote 501–519 within the gantry subzones so as to distribute demand substantially equally across all gantry subzones of the respective group, as well as between the groups. Each article will preferably reside within one gantry subzone group 51–54 so that each gantry subzone in one group will be respectively replenished by a single replenishment station 55–58 by consolidating all like articles within one gantry subzone group. The assignment of an article to one of gantry picking subzone groups 51–54 begins with the highest velocity "G1" article being replenished in replenishment station 55 and thus assigning this article to gantry subzone group 51. The replenishment station positions the stack of high velocity "G1" articles in the front (i.e., closest to conveyor 27 in the gantry subzone 29A), rightmost (i.e., the upstream side of the tote relative to the conveyor movement) compartment of pick tote 504 so that this article stack will be closest to the conveyor system 27 whereon the order receiving areas 27A are defined. This minimizes the movement of the individual article transfer gantry 655 transverse to the movement direction of the conveyor system 27. The next highest velocity "G1" article will be assigned to gantry subzone group 53 which, in the illustrated arrangement, is on the opposite (left in FIG. 15) side of the conveyor system 27 from gantry subzone group 51. The replenishment station 57 will place the stack of next highest velocity "G1" articles within the front of pick tote 504 assigned to position P1 in gantry subzone 53A so that this stack of articles will be closest to the conveyor system. The article assignment step then rotates to group 54 replenished by replenishment station 58 and finally to group 52 replenished by replenishment station 56.

When a "G" velocity coded article has a predicted pick cycle requirement for multiple article stacks, then that article is distributed across multiple picking subzones within a single gantry subzone group. For example, if the highest velocity article has a predicted pick cycle requirement of four article stacks and it is assigned to replenishment station 55, then gantry subzones 51A, 51B, 51C and 51D will each receive one article stack to level load the article across the group 51. The replenishment station 55 places one article stack within pick tote 504 assigned to gantry subzone 51A, places one article stack within pick tote 504 assigned to gantry subzone 51B, places one article stack within pick tote 504 assigned to gantry subzone 51C, and places one article stack within pick tote 504 assigned to gantry subzone 51D. Thus, this article type is evenly distributed across multiple gantry subzones 51A–51D within one gantry group 51 that is replenished by a single replenishment station. If subsequent "G1" coded articles being arranged in the gantry pick zone 29 still require multiple article stacks, then the assignment process proceeds from gantry group 51 to gantry group 53, then to gantry group 54 and finally to gantry group 52, before returning to gantry group 51. When the article assignment step proceeds from the "G1" subcoded articles to next velocity subcode articles, i.e. "G2" subcoded articles, the assignment process continues to rotate through the gantry groups 51–54 to maintain an even workload across the groups. The assignment of one article type requiring more than one article stack into totes within one gantry subzone group 51, 52, 53 or 54 begins with the first compartment of its 504 tote respectively assigned to first gantry subzone 51A, 52A, 53A or 54A and proceeds through all of the 504 tote first compartments within that gantry subzone group until all of the required article attacks have been assigned. When the last article stack for a particular article is placed within the first compartment of the inactive pick tote 504 designated to one gantry subzone within the group, then the assignment process sequences to the next group. Once all of the groups have received one article type (i.e., group 51 receiving more than one stack of the highest velocity "G1" subcoded article, group 53 receiving more than one stack of the second highest velocity "G1" subcoded article, group 54 receiving more than one stack of the third highest velocity "G1" subcoded article, and group 52 receiving more than one stack of the fourth highest velocity "G1" subcoded article). The process then begins again with the next compartment of the inactive pick tote 504 assigned to gantry subzone 51A, and proceeds through the other inactive pick totes 504 in the subzone group until about 90% of the compartments of the 504 totes are filled (e.g. 43 out of 48 compartments filled). The allocation process then proceeds to the 508 pick totes until its compartments are about 90% filled, and then proceeds to 511 pick totes and so forth. The remaining 10% of the compartments are held in reserve and may be filled during exceptionally high volume order fulfillment expectations or may be used in pick face adjustment (step 83) as explained below. However, when the article assignment process reaches the "G5" velocity subcoded articles, i.e. those articles having less than or equal to one stack per pick cycle, the assignment process sequences through gantry picking subzones within one group placing one article stack in each subzone before proceeding to the next group. For example, the highest velocity "G5" article stack is assigned first, beginning with the next available compartment in the first available pick tote in the gantry subzone subsequent to the last tote compartment which was previously assigned an article stack. For purposes of explanation it is assumed that the next available compartment is in gantry subzone 53A. The next highest velocity "G5" article stack is then assigned to the first nonassigned compartment in the first available pick tote within gantry subzone 53A, followed by the three subsequent "G5" article stacks being assigned within gantry subzones 53C, 53D and 53B, and then the next four "G5" article stacks being assigned to gantry subzones 54A–54D. The next four "G5"

article stacks are then assigned to gantry subzones 52A–52D, followed by assigning the next full "G5" article stacks to subzones 51A–51D. Thereafter the assignment of article stacks returns to group 51 and gantry subzone 51A. This assignment process continues to fill the totes from the front (the compartments closest to the conveyor) to the rear (the compartments furthest from the conveyor) and upstream to downstream.

In addition to substantially equally distributing the workload across the gantry subzones according to the article velocity, the gantry pick zone definition step may also attempt to distribute the articles evenly across the gantry picking subzones according to other criteria, for example preference categories, which in the case of music articles can be categorized as classical, rock, country, etc. and in the case of video cassettes as children, drama, comedy, etc.

An example of the assignment process follows. The highest velocity "G1" article, which the demand analysis predicts will require four stacks for the next pick cycle, is assigned to the first group 51. The first stack of the highest velocity article is assigned to the first compartment of tote 504 which will occupy position P1 in gantry subzone 51A. The second stack of the highest velocity G1 article is assigned to the first compartment of the first tote 504 assigned to position P1 in gantry subzone 51C. The third stack of the highest velocity G1 article is assigned to the first compartment of the first tote 504 assigned to position P1 in gantry subzone 51D. The fourth stack of the highest velocity G1 article is assigned to the first compartment of the first tote 504 assigned to position P1 in gantry subzone 51B. If the next three highest velocity "G1" articles also require four stacks as determined by demand analysis, then the above steps assigning the article stacks are sequentially performed through groups 53, 54, and 52 in this order.

The above process is repeated for all "G1" subcoded articles until the control system reaches an article for which the demand analysis predicts less than four stacks are needed for the next pick cycle. For ease of explanation, it is assumed that pick totes 508 assigned to position P2 in each gantry subzone are completely filled with "G1" subcoded articles, i.e. each article requiring four stacks thus filling the same compartment in each of the four second totes 508 in one group. The "G2" subcoded articles are the next articles to be assigned to gantry subzones, which articles the demand analysis predicts will require three article stacks to complete the next pick cycle. The first stack of the highest velocity "G2" subcoded article is assigned to the next available compartment, i.e., the first compartment of third tote 511 assigned to position P3 in gantry subzone 51A. The second stack of the highest velocity "G2" subcoded article is assigned to the first compartment of third tote 511 assigned to position P3 in gantry subzone 51C. The third stack of the highest velocity "G2" subcoded article is assigned to the first compartment of third tote 511 assigned to position P3 in gantry subzone 51D. The highest velocity "G2" subcoded article is now fully assigned and the process proceeds to assign the second highest velocity "G2" subcoded article to gantry subzones 53A, 53C, and 53D (group 53) using the same procedure as above discussed for the highest velocity "G2" article. The third highest velocity "G2" subcoded article is assigned to gantry subzones 54A, 54C, and 54D (group 54) using the same procedure. The fourth highest velocity "G2" subcoded article is assigned to gantry subzones 52A, 52C, and 52D (group 52) using the same procedure. The assignment of the fifth highest velocity "G2" subcoded article is assigned to the first group 51, however the first stack is assigned to the first compartment of the third tote 511 assigned to position P3 in gantry subzone 51B because this compartment was next in the sequential assigned order in group 51. The second stack of the fifth highest velocity "G2" subcoded article is assigned to the second compartment of the third tote 511 in gantry subzone 51A. The third stack of the fifth highest velocity "G2" subcoded article is assigned to the second compartment of the third tote 511 in gantry subzone 51C. The assignment of the fifth highest velocity "G2" subcoded article is now complete. The process moves on to assign the sixth highest velocity "G2" subcoded article into tote compartments in subzones 53B, 53A, 53C, the seventh highest velocity "G2" subcoded article into tote compartments in subzones 54B, 54A, 54C, and the eighth highest velocity "G2" subcoded article into tote compartments in subzones 52B, 52A, 52C, and respectively assigns all in the same manner as describe above for the fifth highest velocity "G2" subcoded article. The same procedure is followed for the "G3" and "G4" subcoded articles. More specifically, one subcoded article is assigned to one group and the process sequences through the groups 51, 53, 54, and 52. Within each group 51, 53, 54, 52 the process respectively sequences through gantry subzones 51A, 51C, 51D, 51B; 53A, 53C, 53D, 53B; 54A, 54C, 54D, 54B; and 52A, 52C, 52D, 52B. Thus, the assignment of articles rotates from group 51 to 53, then to group 54, and then to group 52, so as to substantially level load the articles across the four groups (FIG. 15). Further, the assignment step in the illustrated assignment spaces the articles within each group by assigning articles to the top gantry subzone, lower center gantry subzone, bottom gantry subzone, and upper center gantry subzone, e.g. 51A, 51C, 51D, 51B.

The above process continues until it encounters an article (G5 to G8) that demand analysis predicts only one (or less) stack of this article is required. Thereafter, the process sequences through all gantry subzones in one group before proceeding to the next group. Assuming for clarity of description that the highest velocity "G5" subcoded articles begin to be assigned in the third compartment of ninth tote 501 in gantry subzone 52D which compartment is the next unassigned compartment. Then, the control system 25 assigns the second highest velocity "G5" subcoded article to the third compartment of the ninth tote 501 assigned to position P9 in gantry subzone 52B. The third highest velocity "G5" subcoded article is assigned to the fourth compartment of ninth tote 501 in gantry subzone 52A. This article is placed in the fourth compartment because the third compartment was assigned an article during a previous assignment operation because the assignment of article stacks proceeds in the assigned sequence within a group. The disclosed embodiment proceeds in the groups, A to C to D to B, however other sequences are within the scope of this invention. The fourth highest velocity "G5" subcoded article is assigned to the fourth compartment of the ninth tote 501 in gantry subzone 52C. The process now moves to the next gantry group 51 because each subzone in group 52 has received one article stack. The control system assigns the fifth highest velocity "G5" subcoded article to the third compartment of the ninth tote 501 assigned to position P9 in gantry subzone 51D. The sixth highest velocity "G5" subcoded article is assigned to the third compartment of the ninth tote 501 in gantry subzone 51B. The seventh highest velocity "G5" subcoded article is assigned to the fourth compartment of the ninth tote 501 in gantry subzone 51A. The eight highest velocity "G5" subcoded article is assigned to the fourth compartment of the ninth tote 501 in gantry subzone 51C. This same procedure continues until all of the demand analysis predicted article quantities are assigned to the pick totes. Thus, the assignment process sequentially fills tote compartments front to back, upstream to downstream in the next tote which did not receive the previous assignment in that subzone in the subzone sequence within a group (i.e. 51A, 51C, 51D, 51B), and sequences through the groups 51, 53, 54, 52 after a plurality of stacks of a single article are assigned to that group or if four distinct article single stacks are assigned to each subzone in a group.

Once all of the articles have been assigned to the picking resources, i.e. "A" coded articles to nongantry or A-frame dispensers 30 and "G" coded articles to the gantry pick zone 29 and article stacks assigned to pick totes assigned to positions in the gantry subzones, a location map is created for each article including its associated tote compartment and preferred order of gantry subzones from which to pick the ordered article (step 45). The preferred gantry subzone has a preferred compartment from which an ordered article should be picked until the article stack is gone. The preferred tote compartment may be a partially-filled compartment from a prior pick cycle or the first tote compartment which was replenished by step 37. The control system 25 stores the location of each pick tote, and the compartments thereof, and the quantity of each article, in a conventional computer memory device. The map is a table organized into a preferred fulfillment order, which the control system uses to command the gantries in one gantry subzone to pick clean one tote compartment of all the identical articles therein before any other compartment containing the same article is picked from subject to level loading work amongst the gantry subzones as explained in greater detail below. This reduces the number of partially-filled compartments that need to be replenished after a pick cycle is completed. This map is forwarded to the order wave planning step 38 and is used by the pick face replenishment step 37 to replenish inactive pick totes for the next picking cycle.

It is expected that the inactive pick totes 500 will contain partial article stacks due to the quantity of articles actually ordered in the previous pick cycle or level loading of the gantry subzones so that the gantries in the subzones only partially deplete the individual articles from a tote compartment. The control system 25 stores the article quantity and type positioned in each tote compartment. Based on this stored data, if the quantity of articles in both partial article stacks is less than the tote compartment capacity of individual articles that can be held in one tote compartment, then the control system will instruct the replenishment gantry 59 to move a partial article stack from one tote compartment 618 to another tote compartment which also has a partial stack of the same article. In the alternative, if the quantity of articles in the partial article stack plus a complete article stack is less than the tote compartment capacity, then the control system may instruct the replenishment gantry 59 to insert another article stack 616A containing the same articles as the partially filled tote compartment into the partially filled tote compartment. As a further alternative, the control system may instruct the replenishment gantry 59 to remove the partial article stack from its tote compartment and place the partial stack into a storage tote compartment. Thus, the control system 25 decides how to handle partially filled tote compartments during the pick zone definition step 36 according to system requirements.

Gantry Pick Zone Replenishment

The replenishment step 37 (FIG. 3A and 3B) for the next pick cycle executes while the current pick cycle is being executed (step 39). These processes are carried out by means of automated replenishment devices under the direction of the control system 25 and according to the prioritized location map (step 45) developed during the pick face definition step 36 and the remaining articles in the inactive pick totes 500. The automated replenishment equipment may include the storage/retrieval vehicles 26, replenishment gantry-type transfer devices 59 and storage and inactive pick totes 630, 500 (FIG. 14). The pick face replenishment step 37 restocks the inactive pick totes 500 with a full picking cycle supply of articles as predicted by the demand trend line prior to starting the next pick cycle requiring these pick totes. However, the orders for this next pick cycle are being inputted concurrently with the fulfillment of a current pick cycle and simultaneously with the replenishment of the inactive pick totes 500. Thus, the pick face replenishment step 37 relies upon the historical order demands as determined by the demand trend line calculated in demand analysis step 42.

Figure 3B:
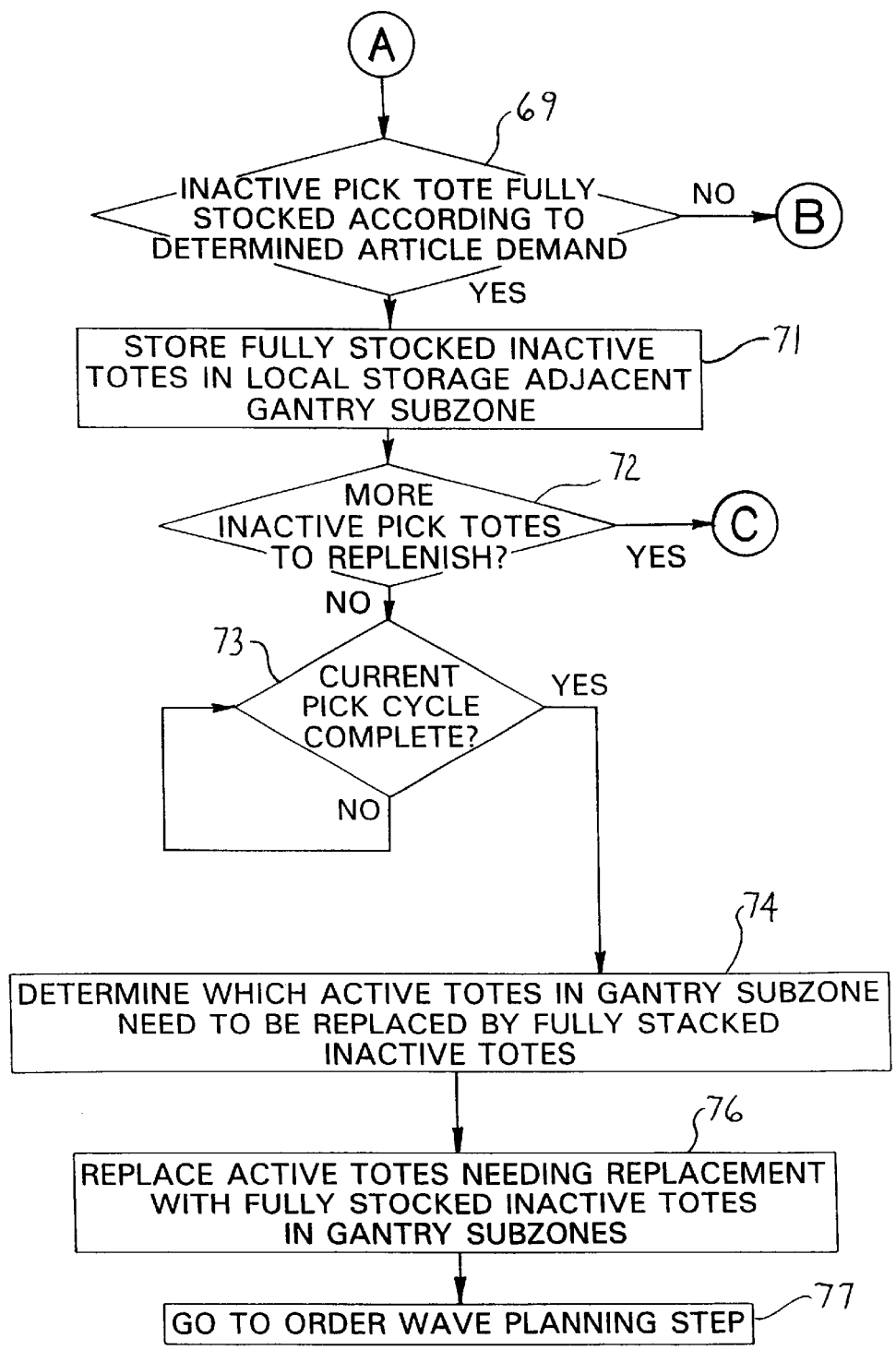

Based upon the demand trend line, articles remaining in the inactive pick totes, and the prioritized location map, the control system 25 develops a replenishment schedule (step 63), FIGS. 3A and 3B. The prioritized location map stores the assigned positions of the articles, and thus the pick totes containing these articles. Articles of similar velocities are grouped together which increases the likelihood that multiple stacks of any article will be located in the same tote position within each gantry group, thereby achieving a common "vertical" location for that article as illustrated in the vertically oriented gantry subzone group shown in FIG. 14. For example, FIG. 14 shows gantry 59 of replenishment station 55 moving an article stack 616A from a storage tote into a compartment of inactive pick tote 507 assigned to position P2 in gantry subzone 51D, which tote receives the third stack of a "G1" subcoded article according to the example discussed above. As shown, the other three inactive pick totes 507, which are respectively assigned to position P2 in gantry subzones 51A, 51B, 51C, are positioned directly above the tote 507 which is positioned at the replenishment station 55. Storage totes 630 are positioned on shelves above the inactive pick totes 500 stored in storage system 24A. This minimizes the number of times a storage tote must be repositioned laterally within a replenishment station to fill inactive pick totes assigned to other gantry subzones within the same group. This also reduces the lateral movement requirements for the transfer vehicle 26 by vertically aligning the recipient inactive pick totes (e.g. 507 in FIG. 14) so that the inactive pick totes only are moved vertically and with minimal or no, longitudinal movement by the vehicle 26 to place the pick tote in the replenishment station adjacent the storage tote containing the particular article to be transferred. For example, if the demand trend line and location map determine that two stacks of one article type are needed and the respective pick totes which will receive one stack each have a similar tote velocity, then these totes will be vertically aligned in an inactive storage location laterally from their respective active pick positions in the gantry subzones. Thus the pick totes are preferably vertically aligned in inactive storage and in the gantry subzones, for example at position P2 in subzones 51A, 51B, 51C, 51D (FIG. 14). The replenishment schedule determines the movement of the inactive pick totes that will eventually occupy the positions in each gantry pick subzone associated with a replenishment station to positions in the replenishment station and associated local storage. While the description herein refers to a single replenishment station, it will be understood that these steps are simultaneously performed on all replenishment stations. In the illustrated embodiment, the control system 25 preferably operates four replenishment stations 55–58 and associated devices simultaneously, although such operations may be sequential.

The sequential movements of the storage totes 630 that supply the needed articles for the next pick cycle are moved from the storage system 24A to a position within the replenishment station amid the inactive pick totes to be restocked. The control system 25 locates the storage totes 630 in the warehouse storage system 24A and identifies the quantity of needed articles therein (step is 64). The control system sends instructions to move the inactive pick tote 500 into the replenishment station that is associated with its respective gantry picking subzone (step 65). The control system 25 instructs the tote moving vehicle 26 to move the storage tote 630 containing the needed article for replenishment from a warehouse storage position to a position amid the inactive pick totes 500 in the replenishment station, and as close as possible to the inactive pick tote which will receive the articles therein (step 66). The control system 25 then instructs the replenishment gantry 59 to transfer an entire article stack from the storage tote into the assigned compartment of the assigned inactive pick tote (step 67) as determined by the gantry subzone definition step 36 and the control system 25 stores the article identifier and quantity in the location map. Additionally, the control system can instruct the replenishment gantry 59 to consolidate partial article stacks in one tote compartment or remove partial article stacks from inactive pick tote compartments. If a further stack of the same article is required, then the control system 25 instructs the vehicle 26 to move an inactive pick tote 500 which will receive the additional article stack into the replenishment station. If necessary, the control system 25 will order the vehicle 26 to remove an inactive pick tote or unused storage tote from the replenishment station to create an open position or the inactive pick tote that will receive the next article stack. The control system 25 instructs the replenishment gantry 59 to transfer the next article stack to the assigned inactive pick tote compartment. The storage totes are then moved back into storage system 24 (step 68). If the inactive pick tote is fully stocked according to the determined article demand (step 69), then it is stored in local storage 24B adjacent its associated gantry subzone (step 71). If the inactive pick tote is not fully stocked, then the process returns to step 66 so that the storage tote containing the next needed article is retrieved. Step 72 determines if more inactive pick totes need replenishment, and if there are more nonreplenished inactive pick totes, then the process returns to step 65 so that the inactive pick totes are moved into the replenishment station and proceeds to replenish these inactive pick totes. If there are no more totes to replenish as determined by step 72, then the control system 25 determines if the current pick cycle is complete (step 73). This step is repeated if the current pick cycle is not complete, i.e. order fulfillment step 39 has not signalled that it has completed the active pick cycle, and holds further processing of the pick face replenishment process.

If the current pick cycle is complete, then the process determines which active pick totes in the gantry subzones need to be replaced by fully stocked inactive pick totes (step 74). This step is accomplished by comparing the demand trend line to the article quantities remaining in the active pick totes remaining in the gantry subzones. Active pick totes that do not contain the required types or numbers of articles as determined by the demand trend line are replaced by fully stocked inactive pick totes that were stored in local storage adjacent their respective gantry subzones (step 76). The control process then proceeds to order wave planning (step 77).

Order Planning

The order wave or batch planning step 38 (FIG. 4) receives the location and quantity of the articles within the replenished pick totes (location map) that have been moved into the gantry subzones by the pick face replenishment step 37 and receives the frozen customer order list from steps 35 and 35A. Order planning begins with combining the frozen customer order list from step 35A with unfulfilled orders from the previous pick cycle (step 81), and results in the current customer order list for the current to-be-initiated pick cycle. Inventory verification and gantry zone adjustment (step 83) compares the quantities and types of articles in the active pick totes within the gantry subzones versus the quantity and types, FIGS. 5A–5C of articles in the current customer order list (step 85). If additional articles are needed to complete the current pick cycle (step 87), then a table of additional articles needed to complete the current pick cycle is prepared (step 89). This table includes the article type identifier and quantity of each article needed to complete the pick cycle. If step 87 determines additional articles are not needed, then the inventory verification and gantries zone adjustment step 83 is complete and the order planning step 38 proceeds (step 88) to create an order pick flow summary for the orders in the current pick cycle (step 117), FIG. 4. However, if additional articles are needed, then the control system 25 locates and quantifies the additional articles stored in the inactive pick totes or storage totes in the replenishment stations, and in the storage system 24A (step 91). If the needed additional article is not located (step 93), then the order is removed from the current customer order list and saved in a control system memory device for addition to the next pick cycle which gives the control system 25 one pick cycle to induce the needed article from remote bulk storage into the warehouse storage 24 (step 95), FIG. 11. Thereafter, the control system 25 directs induction of the needed article from the remote bulk storage (step 95).

After removal of the order requiring an article that can not be added to the gantry pick zone 29 at this time, the process proceeds to inquire whether additional articles are needed (step 97). If additional articles are needed, then the process returns to step 93 and inquires whether this article can be located by the control system 25. If the article is located, then the process inquires whether the additional article resides in an inactive pick tote 500 (step 99). If step 99 determines that no additional articles reside in an inactive pick tote, the method proceeds to step 109. If step 99 locates the additional article in an inactive pick tote, then the control system 25 inquires whether there is an empty tote position in any gantry subzone (step 101). During usual operation, the control system 25 maintains at least one open tote position in each gantry subzone, e.g. as discussed above positions P17–P19 are usually empty. If there is an empty tote position, then the control system 25 instructs tote movement device 26 to insert the inactive pick tote containing the additional article into one of the empty tote positions (step 103) and proceeds to step 97 inquiring whether additional articles are still needed. If step 101 resulted in no empty tote position being in the gantry subzones which may occur during exceptionally high number of different articles being ordered, then the control system 25 determines if a tote in any gantry subzone contains no ordered articles (step 105). That is, does one of the active pick totes contain only articles which are not required to fill any order in the current customer order list? If step 105 results in a yes, then control system 25 instructs the tote movement device 26 to swap the inactive tote containing the needed additional article for the active tote in the gantry subzone that lacks ordered articles (step 107). After step 107, the method proceeds to step 97 to determine if additional articles are still needed.

On the other hand, if step 105 determines that all active totes in the gantry subzone contain ordered articles or if step 99 determines that the additional article does not reside in an inactive pick tote, then the process proceeds to step 109. Step 109 requests that the storage tote retrieval device 26 move a storage tote 630 containing the needed additional article to a replenishment station. The pick tote movement device 26 then moves an active tote 500 having an empty compartment and low velocity subcoded articles, which should occur because during normal operation only 90% of tote compartments are filled during pick face replenishment step 37, from the gantry subzone to the replenishment station adjacent the storage tote containing the additional article (step 111). The control system 25, if possible, selects an active tote that contains similar velocity subcoded articles to the additional article subcode. The control system 25 instructs the replenishment gantry 59 to move a stack of the additional articles from the storage tote into the empty compartment in the active tote that temporarily resides in the replenishment station (step 113). The pick tote movement device 26 then returns the active tote containing the additional article to its assigned gantry subzone position (step 116). The method then proceeds to step 97. If step 97 determines that no additional articles are needed, then the inventory verification and gantry zone adjustment step 83 is complete and the method proceeds to create a order type flow summary for the current pick cycle (step 117), FIG. 4.

Figure 4:
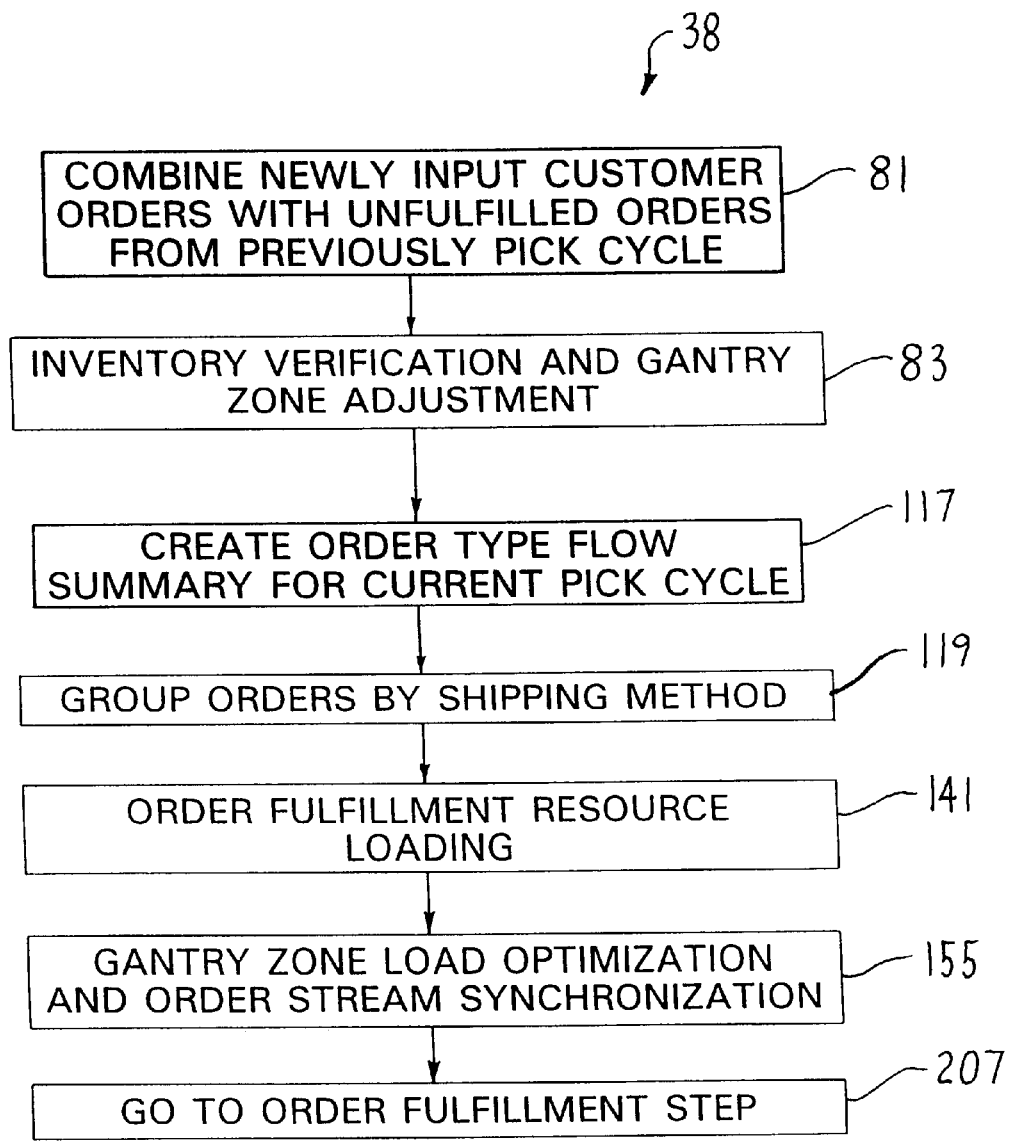
FIG. 4 is a flow chart which illustrates the order wave planning steps.
Figure 5B:
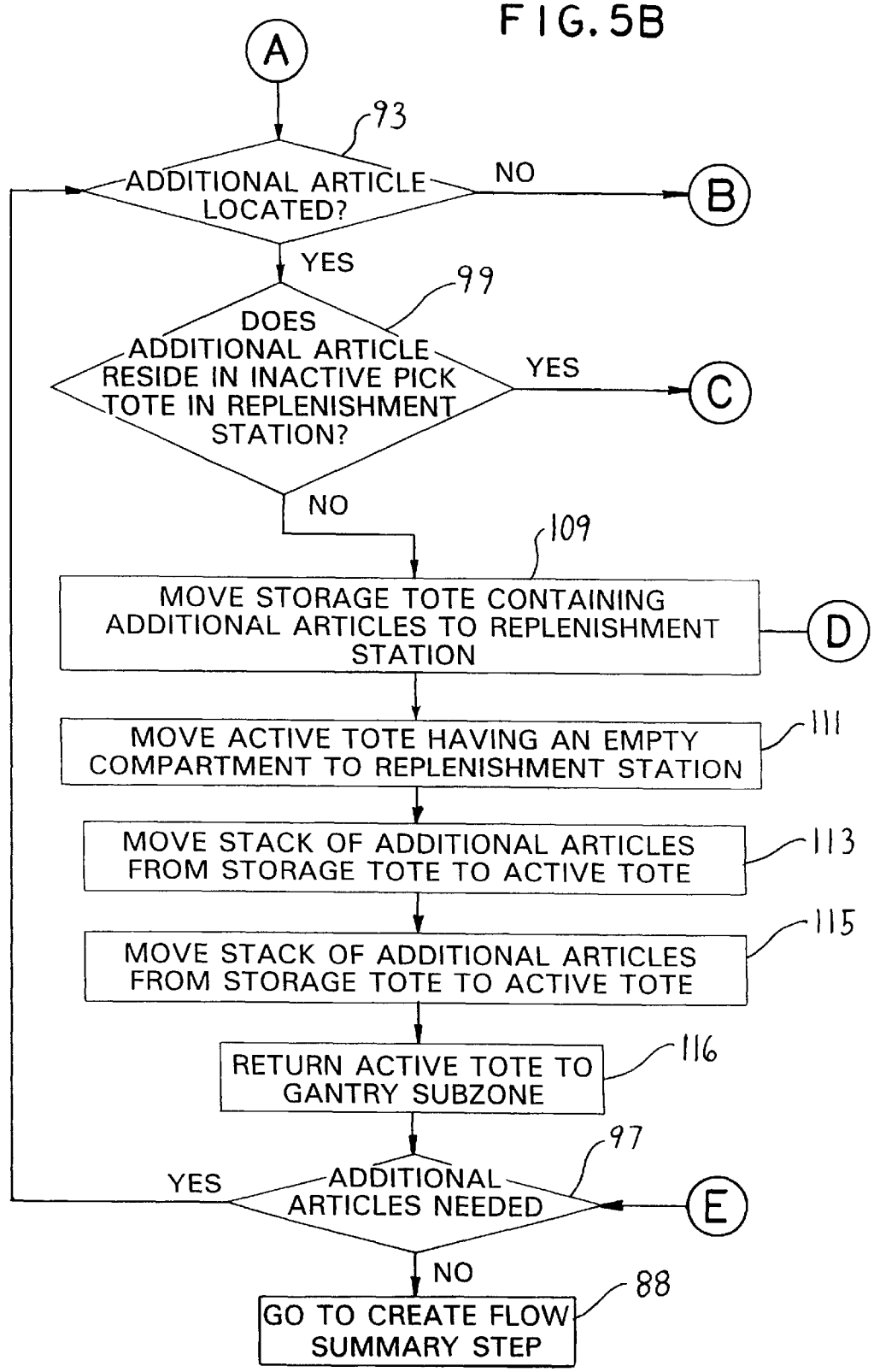
Figure 5C:
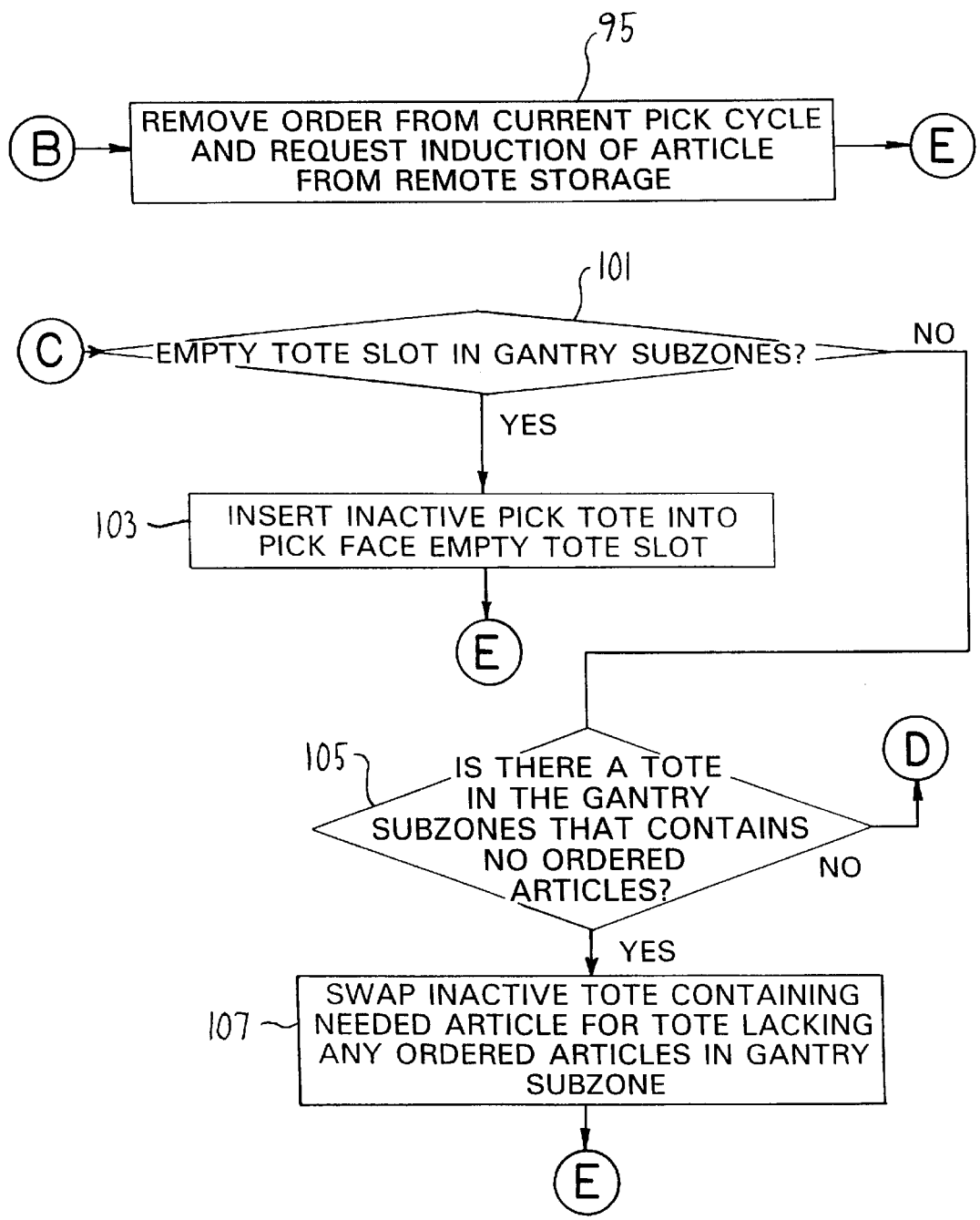

Step 117 creates the order type flow summary for all the orders in the current order list based on the velocity codes of the articles in each order (FIG. 4). The control system 25 sorts through each current order and assigns an order type or designation that corresponds to the velocity of all the articles in that order. For example, an order containing only "A" velocity coded article(s) has an order type "A", an order containing only "G" velocity coded article(s) has an order type "G", an order containing both "A" and "G" velocity coded articles has an order type "AG", and an order containing "A", "G" and "M" velocity coded articles has an order type "AGM", etc.

The order planning step 38 proceeds to group the orders by shipping method (step 119). Each order will include a code which determines how the order is to be delivered and if it qualifies for any discount delivery plan, e.g. by U.S. Postal Service (step 121) or by another delivery method (FIG. 6). If another delivery method is requested, then that order is flagged for non-U.S. Postal Service delivery (step 123) and thereby proceeds to determine if any more orders remain in the current pick cycle which need to determine the delivery method (step 125). If there are more orders for determining the delivering method, then the process returns to step 121. If there are no further orders, then the process proceeds to step 127 and proceeds to the order fulfillment resource loading (step 141), FIG. 4C. If the delivery is by U.S. Postal Service (step 121), FIG. 6, then it is determined whether the order qualifies for fourth class mailing (step 129). If the order does not qualify for fourth class mailing, then it is flagged for U.S. Postal Service third class mailing (step 131) and proceeds to step 125. If the order does qualify for fourth class mailing (step 129), then it is determined if the order qualifies for a U.S. Postal Service discount mailing (step 133). If the order does not qualify for a discount mailing, then the order is flagged for nondiscount fourth class mailing (step 135) and then proceeds to step 125. If the order qualifies for discount mailing, then the control system sorts and tracks all qualified discount mail orders (step 137) and stores the zip code associated with each group of discounted mail orders, and thereafter proceeds to step 125.

While the order planning step 38 discloses grouping orders by delivery method and qualifying orders for discounted U.S. Postal Service delivery, it is foreseen that other delivery methods may also provide discounted, less costly delivery. The control system 25 may qualify orders for other discounted delivery methods using a similar decision structure. For example, if one of the package delivery services—UPS, Federal Express, DHL, etc.—has a discount delivery criteria, the control system will decide if an order or group of orders meets the criteria and thus qualifies for a discount.

Order fulfillment resource loading step 141 (FIG. 7) is then performed to allow either the control system 25 or a system supervisor to respectively automatically or manually configure the various components of the automated pick system 24 according to the current pick cycle needs and system operational parameters. The order fulfillment resource loading step 141 includes presenting discount qualified and nondiscount orders to a supervisor and/or the control system 25 (step 143). The control system stores the operational parameters for all of the automated pick system components (step 145) which includes the speed of the conveyor, the size of the assigned order receiving area, operational time limits of any of the machines, etc. The control system 25 then simulates the effect of the system operational parameters on fulfilling the current pick cycle as presented after qualifying the orders for discount or nondiscount delivery (step 147). The configuration is virtually tested by the control system 25 to see if it violates any of the automated pick system parameter limits in attempting to complete the current pick cycle within its allotted time (step 149). If the current configuration violates any of the automated pick system parameter limits, then the supervisor or control system must revise the configuration and return to step 147 to retest the effect of the revised configuration on the automated pick system. If the configuration does not violate any pick system limits, then this configuration is sent to the load optimizing step 155 (step 151).

The control system 25 then performs the gantry load optimized scheduling and order stream synchronizing step 155 (FIGS. 8A–8E). Step 155 receives the current customer order list and the system configuration that was approved by the order fulfillment resource loading step 141 and extracts all orders having gantry pick articles from the orders lacking gantry pick articles (step 157). The current customer order list includes an order identification code, the ordered article identifiers for each order code, order type code, delivery type for each order, and discount mailing qualified indicator. Orders having gantry picked articles are easily extracted by sorting through the order type for each order and extracting all orders that have the letter "G1" in the order type designation. The extracted gantry orders are then separated into discount and nondiscount mailing orders streams, i.e. lists (step 159).

The control system 25 uses variables stored and computed within the control system (computer) to schedule the physical operation of fulfilling orders having lower frequency of demand articles using the devices in the gantry dispensing zone 29. The control system 25 has gantry subzone counters for each gantry subzone, in the exemplary embodiment the control system has sixteen gantry subzone counters corresponding to the sixteen gantry subzones 51A–51D, 52A–52D, 53A–53D, 54A–54D. The gantry subzone counters represent the number of ordered articles assigned to be picked by the corresponding gantry subzone. The control system 25 computes a gantry subzone counter average from the gantry subzone counters. The control system also stores a counter maximum value which is a preselected user/system defined variable representing the maximum picks one gantry can effectively execute in one pick cycle. The control system also has a nonscheduled tabled discount zip code counter which represents the number of zip codes that have unscheduled (i.e., lack sequence number) discount orders in the execution table. The gantry subzone counters, gantry counter average, and tabled discount zip counter are set to zero (step 161) before beginning any order scheduling. The control system 25 also determines the ratio of discount orders versus nondiscount orders and stores the resultant ratio (step 163). For example, the control system 25 compares the number of nondiscount orders to the number of discount orders and may find that there are six nondiscount orders for every one discount order—a six to one ratio. The control system 25 determines the quantity of each article to be picked during the current pick cycle based on the orders assigned to the gantry pick zone 29 and stores this result as a system determined variable for each article.

The control system 25 then tests to see if there are any unscheduled zip codes for which there are orders in the discount or nondiscount streams (step 165). Step 165 uses zip codes as a scheduling parameter because the U.S. Postal Service allows presorted discount bulk mailings. It is within the scope of this invention to use other parameters in place of zip codes, which parameters will qualify orders for discount delivery. If step 165 yields a no result, then pick load scheduling is complete and the method proceeds to step 199 to synchronize order fulfillment. If step 165 yields a yes result, then the method proceeds to extract all discount qualified orders from the discount stream for one zip code and increments the tabled discount zip code counter by one (step 167), and thereafter sorts the extracted discount orders by execution time and assigns the sorted extracted discount orders to a gantry execution table (step 168). Thus, the control system 25 will attempt to schedule the orders having the longest execution times first. The execution time is the time which it takes for an order to travel through the system 24 from a start point to the finish point, e.g. packaging station. Thus, an order only containing "G" coded articles will have an execution time corresponding to the time it will take for the assigned order receiving bin to travel through the gantry dispensing zone. An order requiring both "A" and "G" coded articles will have an execution time higher than the order having just the "G" or just "A" articles. Therefore, the execution time depends on the speed of the conveyor, length and number of dispensing zones that the order must travel through to be fulfilled. The gantry execution table can include the assigned order identification, all article identifiers codes for the articles in each order, order execution time and location of the ordered article(s) in the active pick face totes from the prioritized location map. The control system 25 will then extract a number of nondiscount orders from the nondiscount order stream (step 169). The number of extracted nondiscount orders is determined by the ratio of nondiscounts to discount orders, which was determined in step 163, e.g. the number of extracted nondiscount orders will be six nondiscount orders for every one discount order based on the exemplary ratio of six to one. The control system 25 thereafter sorts the extracted nondiscount orders by execution time and assigns the sorted extracted nondiscount orders to the gantry execution table (step 171) after the previously assigned extracted sorted discount orders. The control system 25 thereafter determines whether the tabled discount zip code counter is greater than a zip code counter maximum (step 170). The tabled discount zip code counter is the number of discount zip codes open at one time for scheduling in the table, i.e. any nonduplicate zip code for any discount qualified order in the table lacking a sequence number. The zip code counter maximum is a system dependent variable that reflects the maximum discount mail receivers, i.e. bags or cartons, that the packaging device can have open at one time. Thus, step 170 prevents an overflow of discount orders at the packaging device once the pick cycle begins. If step 170 results in no, then the method proceeds to step 173. If step 170 results in a true result, then the nonscheduled orders for one zip code at the top of the execution table are changed to nondiscount qualified orders (step 172) and the method proceeds to step 173.

The gantry load optimized scheduling portion of step 155 proceeds to test if any order within the execution table is unscheduled (step 173). If no orders in the execution table require scheduling, then the method returns to step 165 to test if other additional zip codes need scheduling. When step 173 finds that orders exist in the execution table that are unscheduled, then step 184 determines whether there are more articles in the current order to schedule. If step 184 yields a no result, then the method returns to step 173. If step 184 yields a yes result, then the preferred gantry subzone for picking this article is identified from the prioritized location map (step 174). The control system then tests (step 175) the current gantry subzone to level load the gantry zone 29 according to the following equation:

(the subzone counter+the quantity of article to pick)−(the subzone counter average)<(zone counter maximum).

If the current subzone fails this equation in test 175, then the control system searches the prioritized location map for another subzone containing this article (step 176). If another gantry subzone is located, then this gantry subzone is selected (step 177) and is subsequently tested in step 175.

If the current gantry subzone passes test 175, then the control system tentatively schedules the fulfillment of that article pick operation to the current gantry subzone (step 178). The article pick operation scheduling is tentative because all article picking operations in an order must pass test 175 before that order is scheduled and each ordered article picking operation is definitively scheduled to a gantry subzone. Therefore, the control system must determine if there is another article in the current order to schedule (step 179). If step 179 determines there is another article in the current order to schedule, the method returns to step 174 to determine the preferred gantry subzone for this article.

If step 179 determines that no unscheduled articles exist in the current order, the current order is assigned the next sequence number and the pick operations for each article are definitely scheduled to gantry subzones (step 180) because each article in the order has passed test 175. The control system 25 now increments the gantry subzone counters which are scheduled to pick articles in the sequenced order and recalculates the subzone counter average (step 181). The method determines whether all discount orders in the present, sequenced order's zip code have been assigned a sequence number (step 182). If step 182 yields a no result, then the method returns to step 173. If step 182 yields a yes result, then the method decrements the tabled discount zip code counter by one (step 183) and proceeds to step 173.

Returning to step 176 which the method proceeded to after failing test 175, when step 176 yields a no result, then step 188 is performed. Step 188 determines whether the current order is a discount order. If step 188 yields a yes result, then the execution table is searched for another discount order with a similar execution time (step 189), i.e. current order execution time ± T where T is a system or user defined range variable. In the preferred embodiment, the execution times in step 184 will be tested to see if they are the same, i.e. T=O. If step 189 yields a yes result, then the system selects the order with the similar execution time as the current order (step 191) and returns to step 184 to select the first article in the current order to schedule and locates the new current ordered articles preferred gantry subzone from the location map (step 174). If step 189 yields a no result, then step 193 determines whether there is a nondiscount order with a similar or higher execution time in the execution table. If step 193 yields a no result, then step 165 is performed and the next zip code order set, if any, is added to the execution table (steps 167–171). If step 193 yields a yes result, then the next nondiscount order with a similar or higher execution time is selected as the current order (step 194) and the method returns to steps 184 and 174 to select the first article to schedule and locate the preferred gantry subzone for at least the first article in the current order.

Referring back to step 188 which determines whether the current order that failed test 175 and does not have another article to test (step 176) is a discount order, if step 188 yields a no result, then step 195 determines whether another nonscheduled nondiscount order is in the execution table. If there is another nonscheduled nondiscount order in the execution table, then it is selected as the current order (step 196) and returns to step 184. If there is not another nonscheduled nondiscount order in the execution table, then the next sequence number is assigned a null set for each gantry subzone containing articles in the first unscheduled order in the execution table (step 197). This attempts to reduce the load on these gantry subzones by sending each a virtual order that contains no articles, i.e. reduces the article picking workload for these gantry subzones. Thereafter, step 198 decreases the gantry subzone counter(s) for each gantry subzone that was assigned a null set by one and recalculates the gantry subzone counter average and returns to step 173.

Figure 8A:
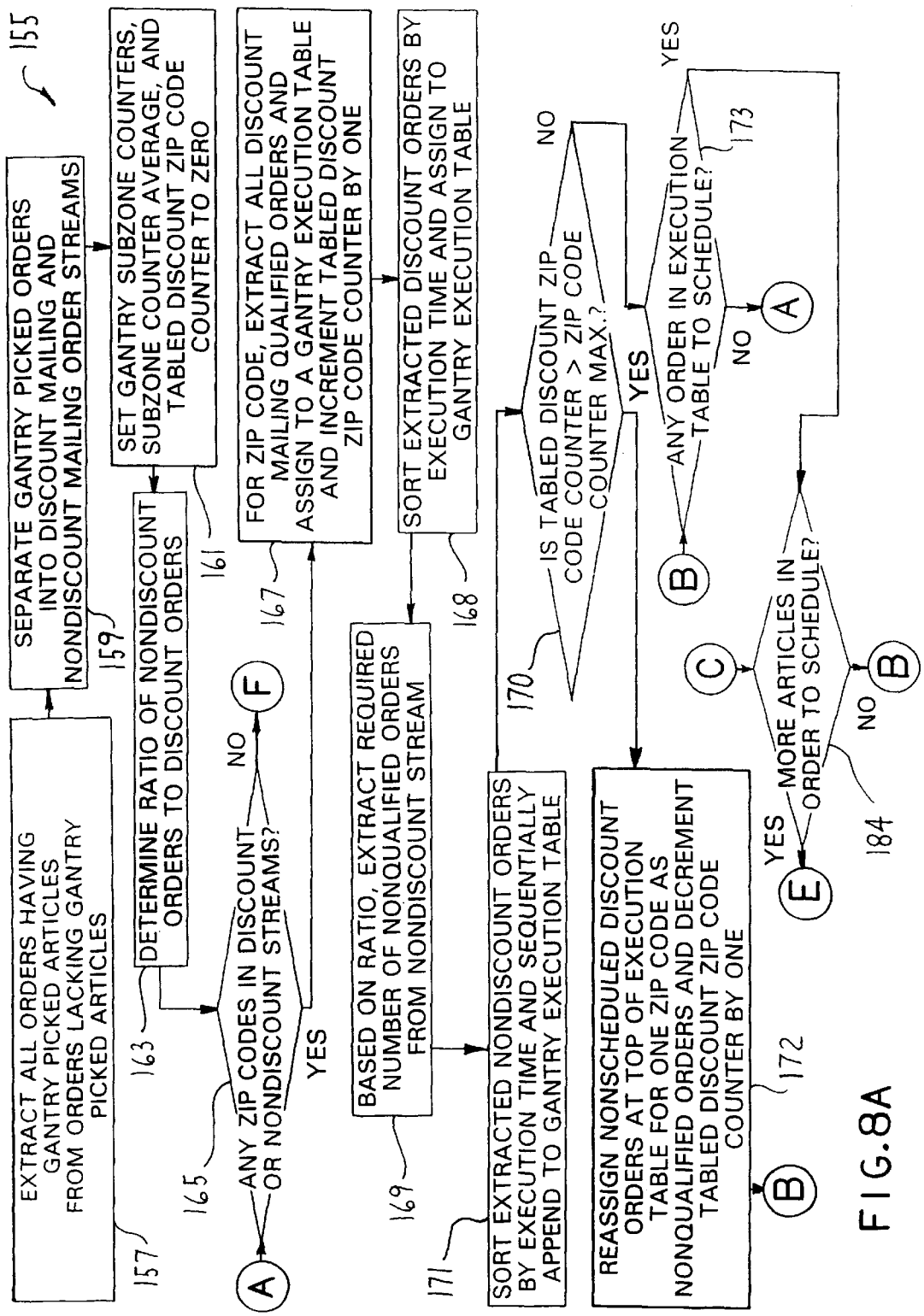
Figure 8C:
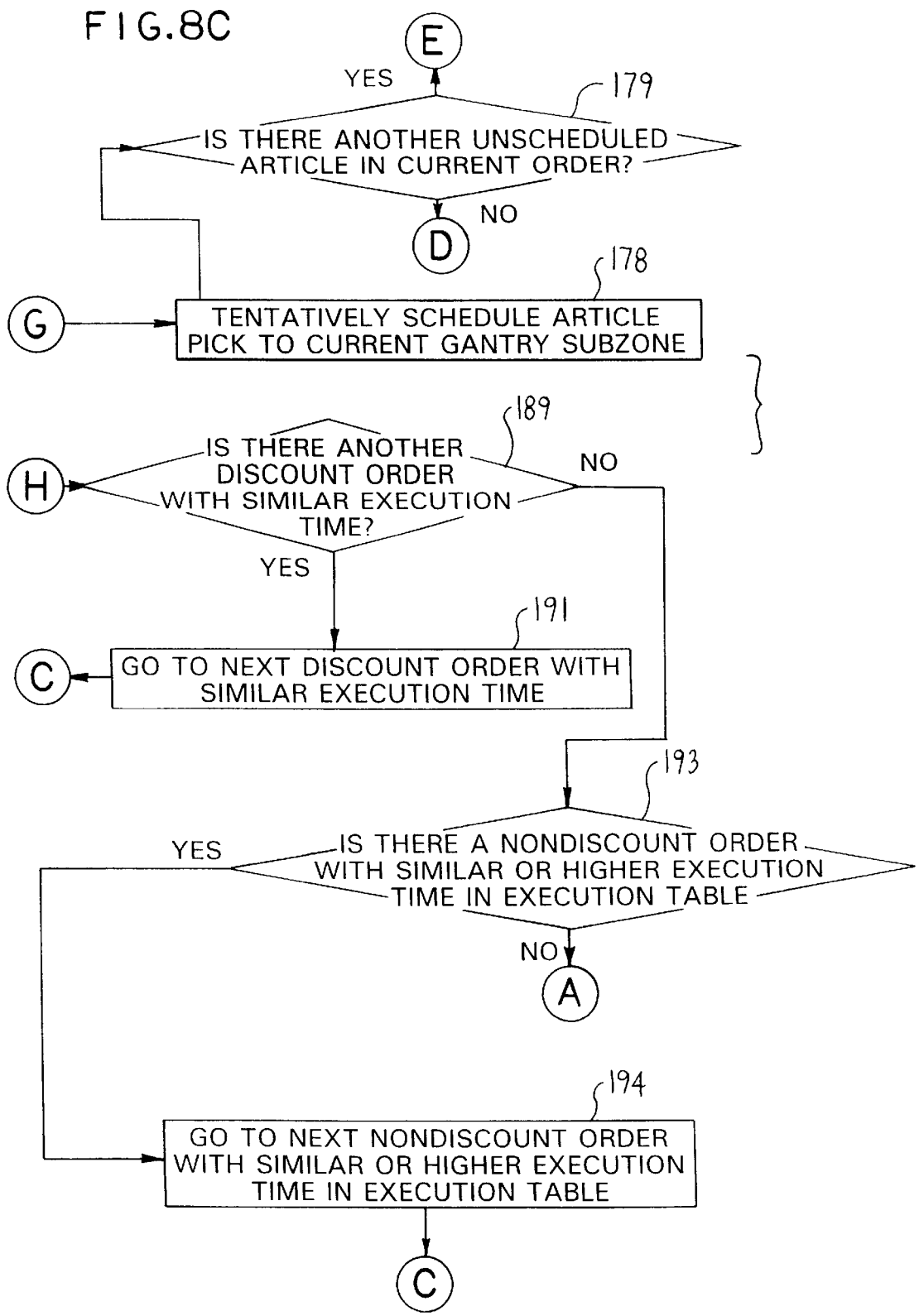
Figure 8D:
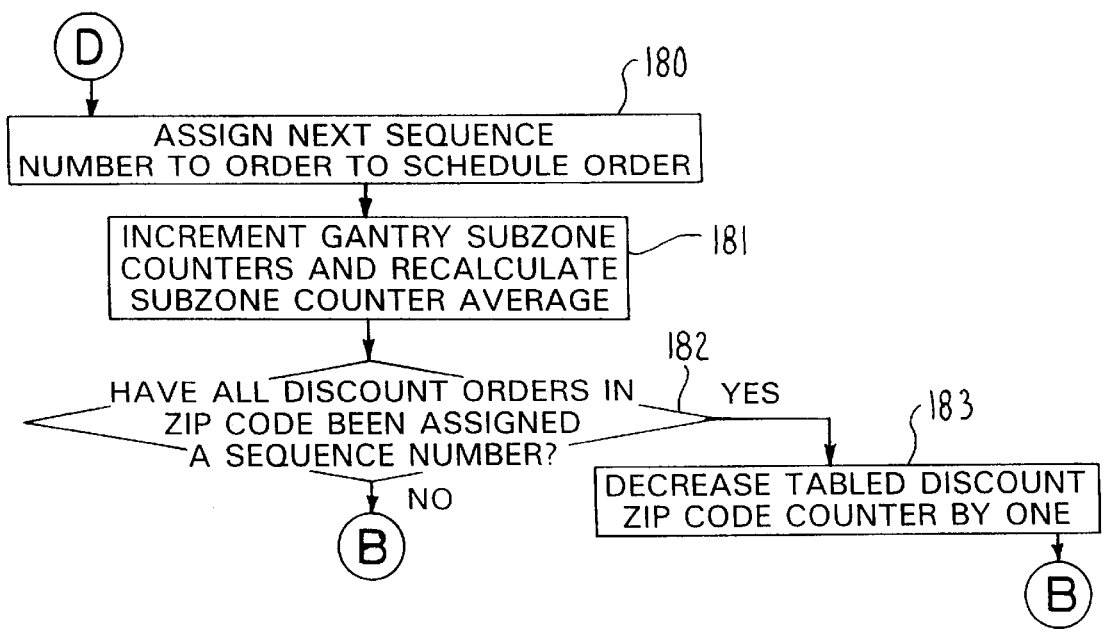
Figure 8E:
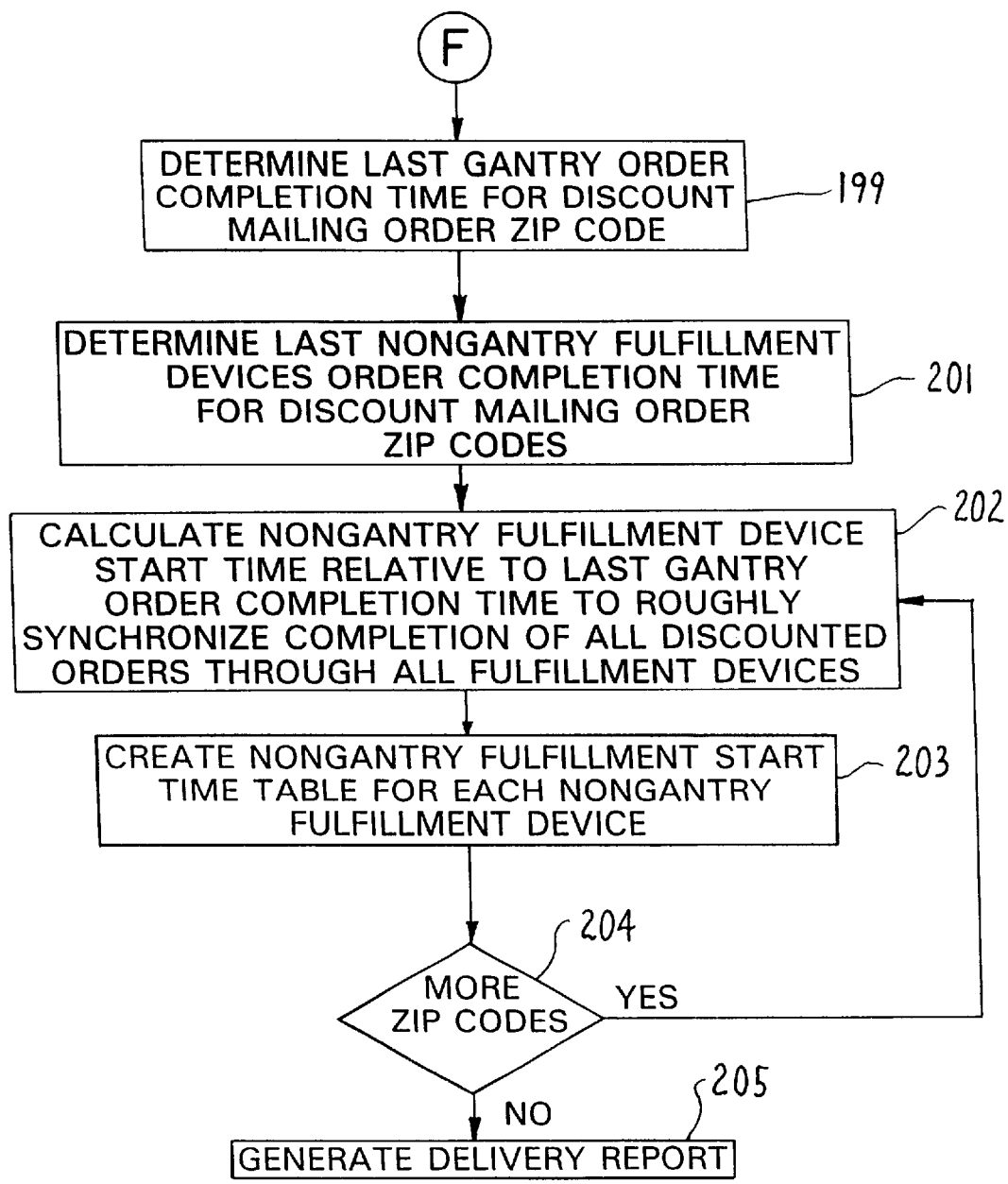

Once the final execution gantry table is produced, e.g. no additional zip codes or orders to schedule, the control system 25 determines the last gantry completion time for the discount mailing order zip codes (step 199), FIG. 8E with each order within the zip code having a sequence number. The last gantry completion time for each zip code having a discount qualified order is appended to the execution table. The control system then determines the last nongantry fulfillment device order completion time for the discount mailing order zip codes (step 201) and stores the nongantry completion time in the execution table. In order to synchronize the completion of all orders for a specific discount mailing zip code, the control system calculates the nongantry fulfillment device start time relative to the last gantry order completion time to roughly synchronize completion of all the discounted orders for a certain zip code (step 202). Once these start times are determined, the control system 25 compiles the start times into start tables for each nongantry fulfillment device (step 203). The control system then tests to see if the nongantry fulfillment start times for another zip code are needed (step 204). If more nongantry fulfillment start times are needed, then the process returns to step 202. If no additional nongantry fulfillment start times are needed, then the process generates a delivery report (step 205) which is sent to order fulfillment step 39.

Order Fulfillment

Figure 9:
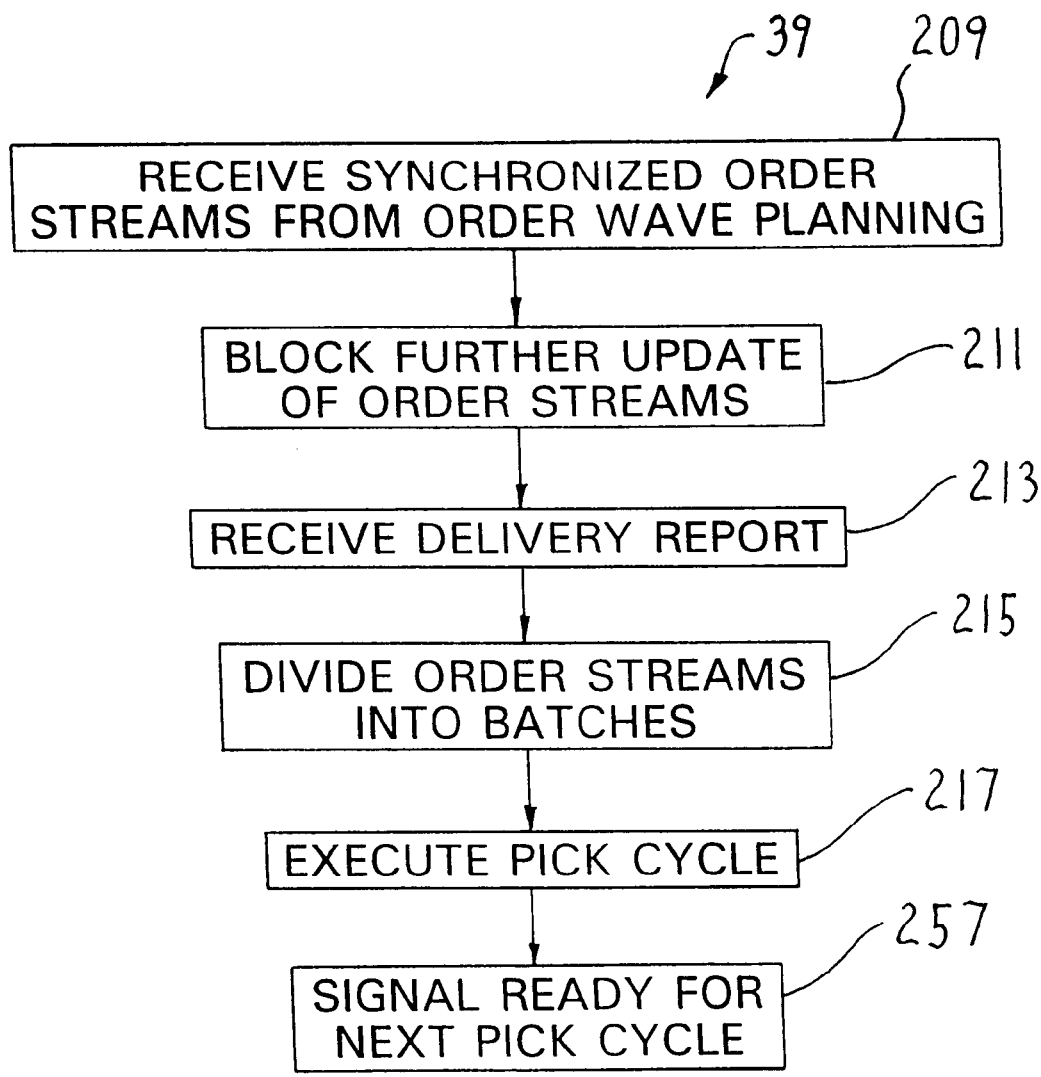
FIG. 9 is a flow chart which illustrates the order fulfillment steps.

The order fulfillment step 39 receives the synchronized order stream, tables and delivery report from the order wave planning step 38 and executes a pick cycle. The order fulfillment step 39 (FIG. 9) blocks any further update of these order streams and execution table (step 211) to freeze the data it will use to fulfill the current orders. The delivery report from the order wave planning (step 213) includes the order execution start times, the packaging requirements and shipping requirements. The shipping requirements include the bags or containers necessary for the discount mailing qualified orders. The order stream is divided into batches (step 215) for discrete execution. The number of orders in the batches are automatically adjusted so that any one zip code is not split across two separate batches. These batches help sequence the commands sent to the fulfillment devices into time periods, which assist in controlling all the fulfillment devices and conveyor system during a pick cycle.

Figure 10:
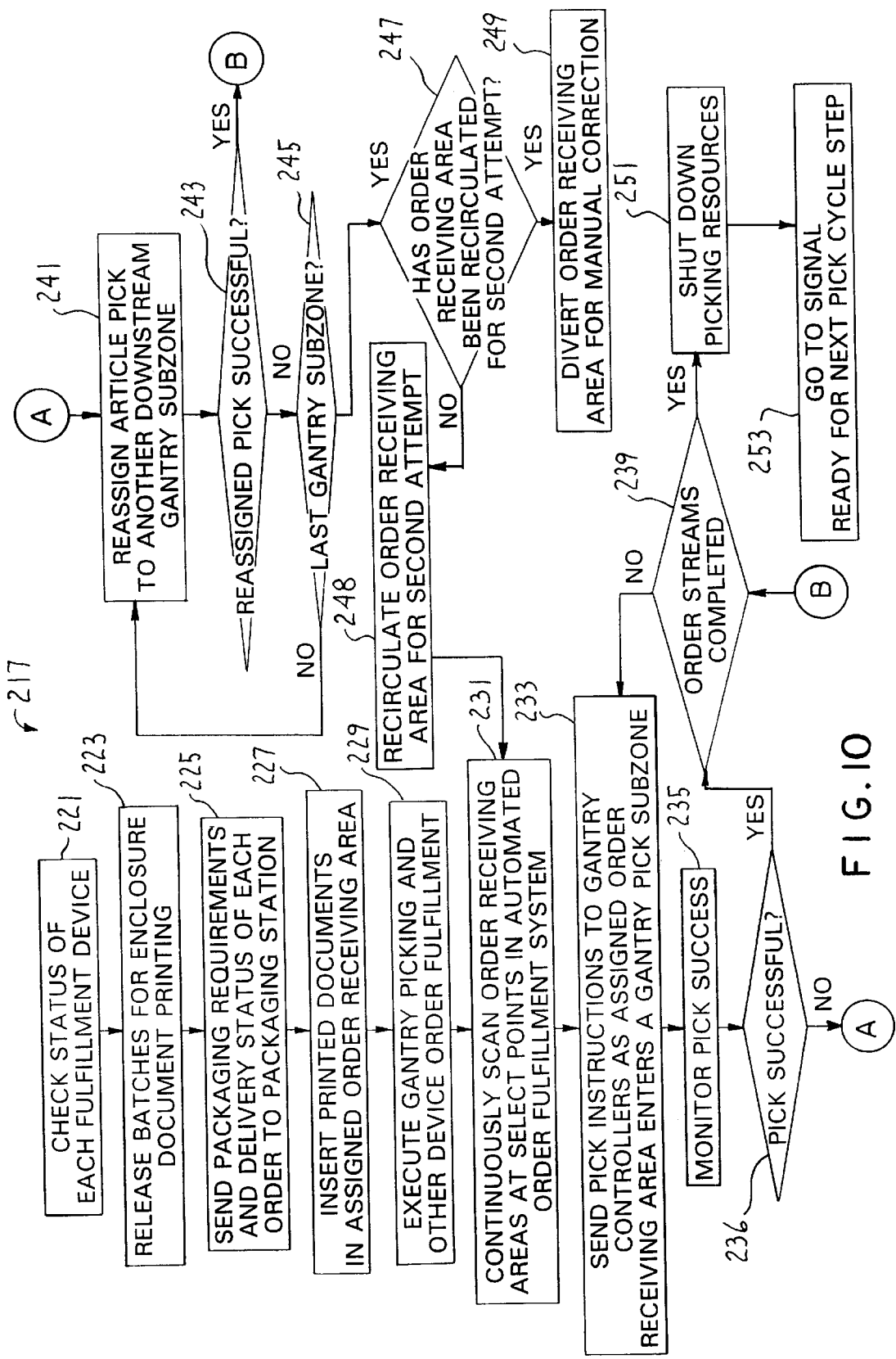
FIG. 10 is a flow chart which illustrates the execute pick cycle steps.

The order fulfillment step 39 then proceeds to execute the pick cycle (step 217), FIG. 10, which performs the actual order fulfillment. The pick cycle execution step 217 first checks the status of each fulfillment device (step 221) to ensure that each is ready for the tasks that will be assigned to it to fulfill all of the orders in the current pick cycle. If the status of all fulfillment devices are satisfactory, then the batches are sequentially released for enclosure document printing (step 223). Each batch is released in certain discrete time increments to the printing device 31 so as to allow sufficient time for the necessary documents, which include invoices and other preprinted materials that ride along with the orders, to be prepared for each batch. Thus, one batch is printed while the previously printed batch is fulfilled. The control system 25 instructs the printer to deliver the printed documents to designated locations for dispensing and dispenses the documents to the designated order receiving area 27A that ride on the conveyor system 27 or provide the printed enclosures to the packaging station. The packaging requirements and delivery status for each order is sent to a packaging station 32 (step 225). Once the printed documents for the batch are prepared, they preferredly are then inserted into the assigned order receiving area 27A (step 227).

The control system 25 then sends the gantry picking and nongantry order fulfillment devices 29, 30 execution instructions (step 229). These execution instructions may be sent to intermediately positioned programmable logic controllers which control the individual fulfillment devices 29, 30. The control system 25 continuously scans the conveyor system 27 for order receiving areas 27A at select points in the automated order fulfillment system (step 231) to determine when the order receiving areas 27A enter into the delivery area of an order fulfillment device. A schematic representation of a scanning device 27B is shown in FIGS. 16A–16D at the start (upstream) end of gantry subzone 51A. The system control 25 or intermediate controllers send explicit pick instructions for an order that is assigned to the order receiving area 27A entering the order fulfillment device area (step 233). The gantries monitor an article pick success (step 235) and reports it back to the control system. The control system determines if the article pick was successful (step 236). If the control system determines that the pick was successful, then it determines if the order stream or batch is completed (step 239). If the order stream or batch is not complete, then the process returns to step 233 to continue fulfilling of orders. If the fulfillment was not successful, then the article fulfillment is reassigned to another downstream fulfillment device that contains the desired article (step 241). For example, if an upstream gantry subzone fails to fulfill its assigned article pick, the control system attempts to reassign the article pick to a downstream gantry subzone. This reassigned pick is also monitored and determined if it was successful (step 243). If the reassigned article pick is successful, then the process returns to step 239 to test if the order stream has been completed. If the reassigned fulfillment task was not successful, then the control system 25 determines if this unsuccessful pick task was assigned to the last order fulfillment device of the type which contains the article or could not be assigned to the last fulfillment device 29 or 30 if it has not previously ben recirculated (step 245). If step 245 results in no, then the control system returns to step 241 to reassign this unsuccessful article pick to another downstream fulfillment device. If step 245 is yes, then the order receiving area 27A is recirculated for a second attempt (step 248) through the fulfillment device 29, 30 if it has not previously been recirculated (step 247). If the order receiving area 27A has been recirculated previously for a second attempt (step 247), then this order receiving area is diverted to a manual correction station (step 249). If the order has not been recirculated for a second attempt, then the control system 25 recirculates the order receiving area 27A and returns to step 231, whereby the order receiving area is rescanned into the fulfillment process and proceeds from there in an attempt to fulfill this order.

Once the fulfillment of the order stream, i.e. pick cycle, has been completed (step 239), then the order fulfillment step sends the required shutdown instructions to all of the picking resources (step 251) and signals that the fulfillment system is ready to swap active depleted pick totes with replenished inactive pick totes for the next pick cycle (step 253). The order fulfillment step then signals that it is ready for the next pick cycle and begins the entire process over again by receiving input customer orders (step 35) and pick face replenishment step (step 37). However, the input customer orders step 35 and the pick face definition step 36, and inactive pick tote replenishment step 37, for the next pick cycle can be executed while the picking operation for the current pick cycle is being executed so that once the current pick cycle is complete, then the pick face replenishment step 37 for the next pick cycle can begin swapping inactive totes for active totes according to the process as described in replenishment step 37 (FIGS. 3A–3B) above.

Figure 16B:
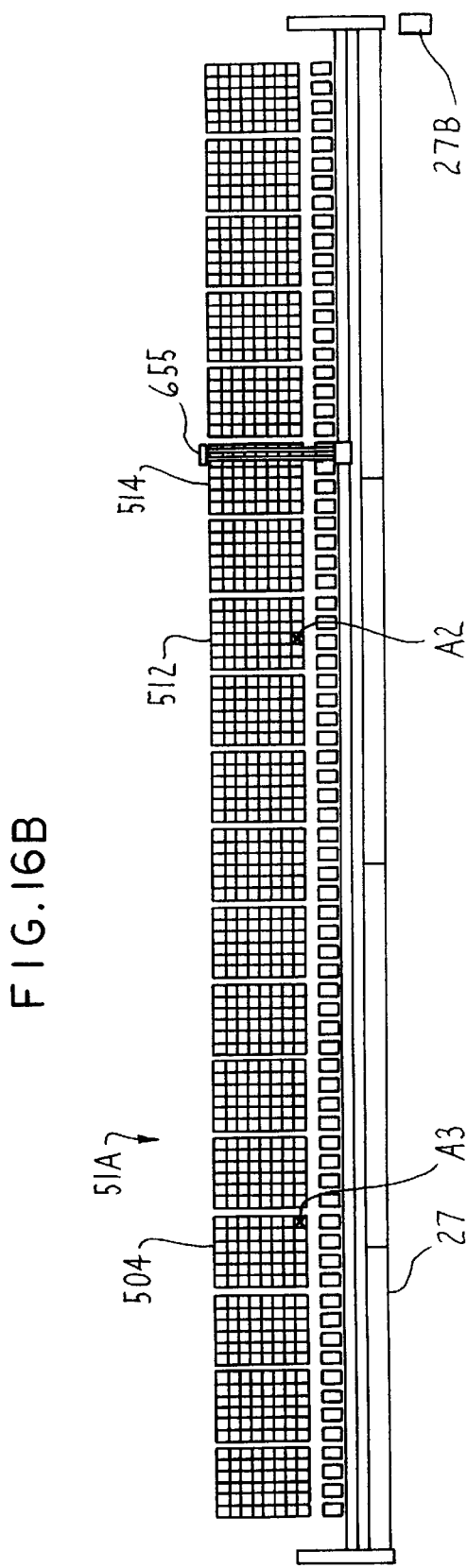
Figure 16D:
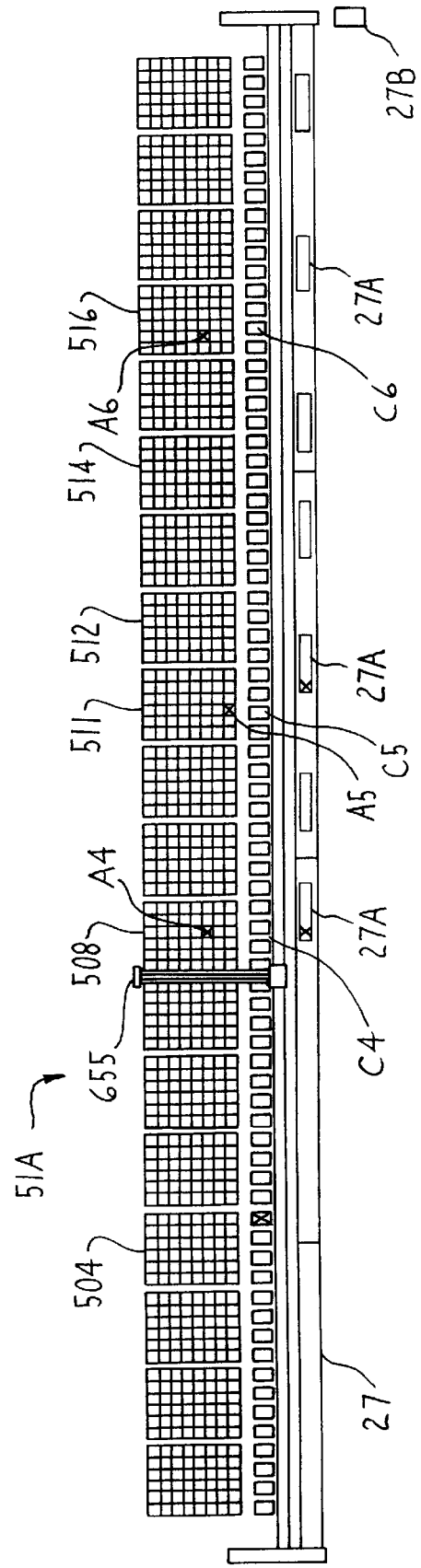

The control system 25 controls the gantries 655 to cause them to pick ordered articles from the gantry subzones 29A according to the order stream batches. FIG. 16A shows the gantry 655 at the beginning of the pick cycle. The control system 25 directly informs the gantry 655 or its immediate controller of the article locations whereat ordered articles to be picked are located. The gantry 655 travels parallel to the conveyor system 27 in a first direction until it is positioned over the first article A1 to be picked, i.e. positioned over the first compartment of tote 514 in FIG. 16B. The gantry pick head 656 (FIG. 14) moves transversely to the first direction until it is positioned over the stack of articles A1 in the first compartment of tote 514 (FIG. 16B). The gantry pick head 656 removes one article (i.e., the top article) A1 from the article stack in the first compartment of tote 514 and places the picked article A1 into one of the intermediate dispensers or chutes C1. The gantry 655 moves toward article A2 (leftward in FIG. 16B) until the gantry is positioned over the second article A2 to be picked, i.e. positioned over the stack of articles A2 in the fourth compartment of tote 512. The gantry pick head removes the top article A2 from the article stack in the fourth compartment of tote 512 and places the picked article A2 into chute C2 (FIG. 16C). The gantry then moves (leftward in FIG. 16C) toward article A3 until the gantry is positioned over article A3. The gantry pick head moves over the first compartment of tote 504 and removes the top article A4 from the stack of articles A4 and places the one picked article A4 in chute C3. There are no additional articles to be picked in the first direction from the current gantry position and the end of the gantry subzone 51A. The control system 25 sends the gantry 655 the position of articles to pick during movement back toward its home position (rightward in FIG. 16D) in a second direction opposite the first direction. The gantry 655 sequentially moves to the tote compartment containing articles A4, A5, A6 and respectively places the picked ones of articles A4, A5, A6 into chutes C4, C5, C6. The process of moving the gantry in the first direction and then oppositely in the second direction is repeated until all of the articles which must be picked from the gantry subzone are placed into chutes. This same process is simultaneously performed in all gantry subzones 51A–51D, 52A–52D, 53A–53D, 54A–54D.

While the respective gantry 656 is picking articles from the active tote compartments and placing them into the chutes, the conveyor system 27 moves order receiving areas, here shown as order receiving bins 27A, through the gantry subzones 29A. A sensor 27B identifies order receiving bins 27A as they enter the gantry subzone 51A and reports which bins have entered the gantry subzone to the control system 25. The control system 25 times the release of the articles from the chutes C1–C6 so that the articles A1–A6 fall into the bin assigned to a particular order. For example, if the first bin 27A is assigned to the order which includes article A1, then when the first bin 27A passes chute C1 the control system 25 instructs the chute to discharge article A1 into first bin 27A. The chutes may each include a gate which is opened by an electrical signal from the control system 25. The control system 25 takes into account the size of the bin 27A, speed of the conveyor, and the time for the article to drop from the chute to determine when the gate should open and discharge the article so that the article is received in its assigned bin. If the third bin 27A is assigned to the order which includes article A2, then when the third bin 27A passes chute C2 the control system 25 instructs chute C2 to drop article A2 into third bin 27A. This procedure is simultaneously performed in all gantry subzones 51A–51D, 52A–52D, 53A–53D, 54A–54D.

Induction of Articles from Remote to Local Storage

Figure 11:
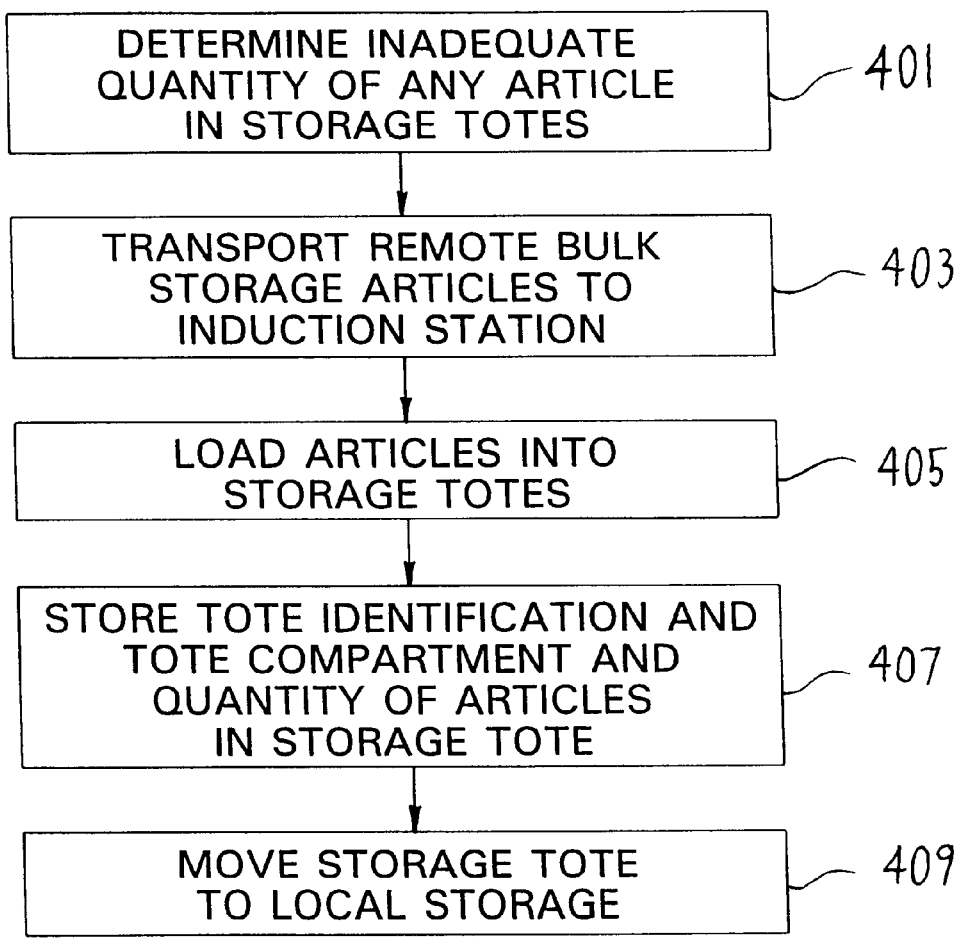
FIG. 11 is a flow chart which illustrates the induction method steps.

As discussed in step 95, if an article does not exist in local storage, then the control system 25 requests induction of this article from a bulk remote storage location (FIG. 11). When the control system 25 determines that the storage totes have an inadequate quantity of any article (step 401), then it commands the remote bulk storage articles to be transported to an induction station. The control system 25 stores the type and quantity of each article within the storage system 24 and compares the quantity of each article with the predicted quantity needed for a set time period, i.e. one or two pick cycles, or one day, as determined by the demand analysis. The control system 25 will store at least the article quantity for the set time period in the storage system 24. The time period is a system dependent variable that depends on the quantity of articles to be stored in the storage system. Preferably, the control system maintains at least a one day supply of all articles within the storage system 24. The induction station 33 will include the ability to remove the articles from the bulk storage device, and place them into a vertical stack which can be gripped by a gantry mechanism to load the stacked articles into storage totes 630 (step 405). The tote identification and specific tote compartment containing the articles is stored in the control system (step 407). Further, the quantity of articles stored in that storage tote compartment is also stored (step 407) in the control system. The storage tote 630 is then moved into storage and its storage location is also stored in the control system (step 409).

The chutes C1–C3 can be designed to operate like queue stations, for example as described in U.S. Pat. application Ser. No. 08/853,986 filed May 9, 1997, titled "High Speed Picking System", and naming Robert Lichti as inventor, which application in its entirety is herein incorporated by reference.

The control process of system 25 of this invention desirably permits automatic control over the positioning and dispensing (i.e., picking) of different types of individual articles from a very large inventory or storage of different types of articles, which inventory may and preferably contains several thousands different types or identifications of articles therein, with each different type of article involving a significant number of identical such articles maintained in storage. The articles in storage can be maintained in batches, such as vertical stacks, and can be moved to an interim or intermediate location which positions them for ready access to and transfer into a dispensing area, based upon order demand. In the dispensing area, automated dispensers are respectively associated with a plurality of related dispensing subzones so that a large plurality of different types of articles, which are identified on orders being filled, can be selectively disposed in defined locations along the dispensing subzones for close and efficient association with both an article pickup and transfer device, and a order receiving device or conveyor. The dispensing zones contain and permit ready access to a large plurality of different type articles to permit filling of a large plurality of orders, with the number of orders being handled within a single filling cycle typically being thousands, and each order containing one or more different type articles. The orders are filled from a large quantity of low-demand different type articles disposed in the dispensing subzones so that the number of different type articles in the subzones itself may be in excess of one thousand. At the same time, the total number of different type articles maintained in storage, and from which the articles in the dispensing subzones are selected, may be in the order of several times the number of different type articles maintained in the dispensing subzones at any one time.

The controlling method is also desirable for use in combination with the supplying of high-demand articles, that is articles wherein the order demand quantity is typically several times and in many cases orders of magnitudes greater than the demand for low-demand articles. A separate order filling zone having separate automated high speed dispensers is provided in this latter zone, but this latter zone can be automatically coordinated with and in fact effectively sequenced to the low-demand article fulfillment zone so as to permit automated filling of orders containing both high-demand and low-demand articles. The number of different type high-demand articles, however, is generally a small fraction of the number of different type low-demand articles maintained in the low-demand filling zone. For example, the low-demand filling zone may contain a minimum of from about three to five times the number of different type articles than is contained in the filling zone for the high-demand articles.

Merely as an example, the controlling system as described herein has the capacity of tracking extremely large quantities of different type articles, for example 10,000 or more different type articles, including tracking the location, type and quantity of each article within the system.

It will be recognized that the order pick system for the low-demand articles may include any number of gantry subzones which are believed necessary or desirable in order to permit efficient handling and filling of orders, which gantry subzones may be arranged in many different spacial arrangements such as horizontally aligned, or vertically spaced from one another, or side-by-side, depending upon the desired and optimum geometry and overall space handling arrangements. Further, each gantry subzone is preferably optimized to provide a number of active pick-face totes which will optimize overall performance in view of the size of the totes, the shape and size of the articles contained in the totes, the performance of the pick gantry, and other system parameters.

While the controlling method and system disclosed herein is particularly desirable for use on articles such as compact discs or video cassettes, it will be recognized that the invention is not limited to such articles and numerous other articles, particularly where a large number of different type articles of substantially similar or identical small shape and configuration, can be desirably processed by the system/method of the present invention.

Although a particular preferred embodiment of the invention has been disclosed in detail for illustrative purposes, it will be recognized that variations or modifications of the disclosed invention, including the rearrangement of steps or parts, lie within the scope of the present invention.

What is claimed is:

1. A control method for fulfilling a plurality of orders, each having at least one ordered article, comprising the steps of:

predicting article demand based on past article demand, storing articles in totes according to predicted article demand, storing the position and quantity of articles in the totes within a control system, positioning the totes in a dispensing zone so that a plurality of different articles are in the dispensing zone and storing the tote positions in the control system, moving a dispenser to an ordered article in the dispensing zone according to the stored article and tote positions and removing the ordered article from the tote, and placing the removed ordered article into an article receiving area to permit fulfillment of an order.

2. The method according to claim 1, further comprising the steps of arranging orders into groups according to one of a plurality of delivery procedures which delivery procedures includes at least one discount delivery procedure.

3. The method according to claim 1, wherein the step of automatically positioning the totes includes the step of verifying that the totes within the dispensing zone have all of the ordered articles and if the dispensing zone does not have all the ordered articles moving the missing article into the dispensing zone.

4. The method according to claim 3, wherein the step of moving the missing article into the dispensing zone includes at least one of the following steps: moving an inactive tote containing the missing article into an empty tote position in the dispensing zone, or shifting the missing article into an active tote having an empty article compartment, or replacing in the dispensing zone an active tote having no ordered articles with an inactive tote containing the missing article.

5. The method according to claim 4, wherein the step of inputting a new customer order set is performed simultaneously with the steps of fulfilling the current customer order set and replenishing the totes.

6. The method according to claim 7, wherein the step of placing the removed article into an article receiving area includes the step of scanning one end of the dispensing zone for entry of an order receiving area assigned to a particular order and timing the release of the removed article so that it is received in the order receiving area as the area travels through the dispensing zone.

7. The method according to claim 6, wherein the step of placing the removed ordered article includes the step of monitoring the successful fulfillment of the ordered article into the article receiving area and if the fulfillment was not successful reassigning the article fulfillment to a subsequent subzone.

8. The method according to claim 7, wherein the step of monitoring includes recirculating the article receiving area for a second fulfillment attempt if there are no subsequent subzones containing the ordered article that was not successfully fulfilled.

9. The method according to claim 1, including the steps of:
   automatically fulfilling a current fulfillment cycle defined by a current set of customer orders by dispensing articles in the current customer order set from totes in the dispensing zone, to thereby at least partially deplete articles from the totes in the dispensing zone,
   predicting article demand for a subsequent automatic fulfillment cycle for a new customer order set based on ordered article history,
   replenishing totes assigned to the dispensing zone based on the determined article demand,
   inputting a new customer order set,
   after the current fulfillment cycle is complete, swapping replenished totes for depleted totes in the dispensing zone and designate the new customer order set as the current customer order set,
   assigning the newly-designated current customer order set to dispensers in the dispensing zones, and
   then returning to the automatically fulfilling step to fulfill the newly-designated customer order set.

10. The method according to claim 9, wherein the step of replenishing the totes in the dispensing zone includes the step of assigning each article to a tote according to determined article demand so as to level load the articles in the totes so as to level load the fulfillment operation throughout.

11. The method according to claim 10, wherein the step of automatically replenishing includes the step of assigning each tote a frequency code based on the order frequency of the articles assigned to the tote.

12. The method according to claim 11, wherein the step of swapping replenished totes for depleted totes includes the step of assigning the replenished totes to positions in the demand dispensing zone according to a hierarchy of the tote frequency codes.

13. The method according to claim 12, wherein the step of swapping replenished totes for depleted totes includes the step of comparing the articles in the depleted totes to the determined demand and if the articles in the depleted totes meet the determined demand then leaving those depleted totes in the demand dispensing zone.

14. The method according to claim 1, wherein the step of storing articles includes assigning articles having similar predicted article demand to respective totes.

15. The method according to claim 14, wherein the step of positioning the totes includes assigning the totes to positions in the dispensing zone so as to essentially level load the dispensing zone and thereby distribute the fulfillment workload across the dispensing zone.

16. The method according to claim 15, wherein the step of positioning the totes includes dividing the dispensing zone into a plurality of subzones each having at least one dispenser accessing a plurality of totes, and assigning the totes across the subzones so as to essentially level load the dispensing operation across the subzones.

17. The method according to claim 16, wherein the step of storing articles in the totes includes storing the articles in storage totes and dispensing totes, and transferring articles required for the removing and placing steps from the storage totes to inactive dispensing totes which are positioned adjacent but out of the dispensing zone.

18. The method according to claim 17, wherein the step of dividing the dispensing zone into subzones includes the steps of grouping pluralities of subzones into dispensing groups, assigning each group to one replenishment station which transfers articles from storage totes to the inactive dispensing totes according to predicted article demand, and assigning one article to only one group.

19. A process for filling orders containing one or more individual articles from an inventory containing a large number of low-frequency demand articles, comprising the steps of:
   providing a storage of structurally similar articles including a large quantity of said articles which are different;
   arranging said articles in storage in vertical stacks so that the individual articles within the stacks are identical;
   providing an article dispensing zone which defines a horizontally elongated support area on which stacks of articles are positionable;
   providing a moving article collecting arrangement adjacent and movable along said elongate support area;
   moving selected stacks of articles from storage to a replenishment area which is positioned adjacent the dispensing zone;
   transferring selected article stacks from the replenishment zone to said support area, and positioning said stacks at predetermined locations within said support area based on an analysis of the demand frequency of the different articles, and storing the locations of the stacks in said support area and the number of articles therein in a control system; and
   moving an article picking and transferring device lengthwise of the dispensing zone for automatically removing ordered individual articles from the stacks in said zone for transfer to the collecting arrangement for fulfillment of an order.

20. A process according to claim 19, including the steps of:
   inputting a large number of orders each containing at least one different article identified thereon so as to create an order list which defines a batch of articles which is to be filled in a subsequent order fulfillment cycle;
   preparing a hypothetical order list defining a batch of articles based on actual article demands averaged from prior order fulfillment cycles;
   rearranging stacks of articles at said replenishment area and at said dispensing zone so as to position at said dispensing zone adequate stacks of articles so as to permit fulfillment of all of the articles defined in said hypothetical order list;
   positioning the stacks of articles at the dispensing zone in a predetermined positional relationship based on an analysis of the demand frequency of the individually different articles;
   comparing the actual order list with the hypothetical order list and transferring additional article stacks to or from the dispensing zone so as to define at the dispensing zone adequate articles to fill all of the orders on the actual order list;
   thereafter activating the articles picking and transferring device to individually and sequentially pick ordered articles from the stacks in the dispensing zone and then transfer them to the collecting arrangement.

21. A process according to claim 20, wherein the article stacks in the dispensing zone are positioned so that the stacks containing the highest demand frequency articles are disposed intermediate the ends of an elongate row which is defined by the stacks of articles in the dispensing zone, the lowest demand frequency article stacks are disposed adjacent an upstream end of the row, and others of the article stacks are positioned in generally alternating fashion wherein higher demand frequency stacks approximately alternate with lower demand frequency stacks.

22. A process according to claim 19, wherein the article stacks in the storage are maintained in storage totes which each contain a plurality of upwardly opening cells each adapted to permit storage of a single article stack therein, said storage totes and the stacks therein being transferred to said replenishment area, providing a plurality of pick face totes each containing a plurality of upwardly opening cells each adapted to contain an article stack therein, some of said pick face totes being positioned at said replenishment area and other of said pick face totes being positioned in said dispensing zone, transferring selected article stacks from storage totes to pick face totes at the replenishment area, and transferring pick face totes to and from the replenishment area and the dispensing zone.

\* \* \* \* \*

UNITED STATES PATENT AND TRADEMARK OFFICE
CERTIFICATE OF CORRECTION

PATENT NO. : 6,289,260 B1  Page 1 of 1
DATED : September 11, 2001
INVENTOR(S) : Robert E. Bradley et al.

It is certified that error appears in the above-identified patent and that said Letters Patent is hereby corrected as shown below:

Column 28,
Line 54, change "claim 4" to -- claim 9 --.
Line 58, change "claim 7" to -- claim 1 --.

Column 29,
Line 50, delete "demand".
Line 54, delete "demand".

Column 31,
Line 11, change "claim 19" to -- claim 20 --.

Signed and Sealed this

Second Day of July, 2002

Attest:

Attesting Officer

JAMES E. ROGAN
Director of the United States Patent and Trademark Office